United States Patent
Wang et al.

(10) Patent No.: US 7,624,398 B2
(45) Date of Patent: *Nov. 24, 2009

(54) ACCELERATING A DISTRIBUTED COMPONENT ARCHITECTURE OVER A NETWORK USING A MODIFIED RPC COMMUNICATION

(75) Inventors: Yi-Min Wang, Bellevue, WA (US); Galen C. Hunt, Bellevue, WA (US); Alessandro Florin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1416 days.

This patent is subject to a terminal disclaimer.

(21) Appl. No.: 10/762,804

(22) Filed: Jan. 22, 2004

(65) Prior Publication Data

US 2004/0154028 A1    Aug. 5, 2004

Related U.S. Application Data

(63) Continuation of application No. 09/458,138, filed on Dec. 9, 1999, now Pat. No. 6,708,223.

(51) Int. Cl.
    *G06F 9/44* (2006.01)
(52) U.S. Cl. .................. 719/315; 719/313; 719/314; 719/330
(58) Field of Classification Search ......... 719/313–315, 719/330
    See application file for complete search history.

(56) References Cited

U.S. PATENT DOCUMENTS

| | | | |
|---|---|---|---|
| 5,386,566 A | 1/1995 | Hamanaka et al. | |
| 5,724,588 A | 3/1998 | Hill et al. | |
| 6,044,409 A * | 3/2000 | Lim et al. | 719/315 |
| 6,131,126 A * | 10/2000 | Kougiouris et al. | 719/330 |

FOREIGN PATENT DOCUMENTS

| | | |
|---|---|---|
| EP | 0 642 246 | 3/1995 |
| EP | 0 701 205 | 3/1996 |
| EP | 0 790 564 | 8/1997 |

OTHER PUBLICATIONS

P. Emerald Chung et al, "DCOM and CORBA Side by Side, Step by Step, and Layer by Layer," Sep. 3, 1997, pp. 1-18.*
Forin et al., "*High-Performance Distributed Objects over System Area Networks*," Proceedings of the 3rd USENIX Windows NT Symposium, pp. 21-30 (1999).
Wang et al., "*Exploring Customization of Distributed Systems Using COM*," (Mar. 24, 1999).
"*Connected: An Internet Enclyopedia*," [web page]; FreeSoft.org/CIE/Topics/6-8.htm. [Accessed May 13, 1999].
Bilas et al., "*Fast RPC on the SHRIMP Virtual Memory Mapped Network Interface*," Department of Computer Science, Princeton University, Princeton, New Jersey (Feb. 1997).

(Continued)

*Primary Examiner*—Li B Zhen

(57) ABSTRACT

A method for improving the performance of a distributed object model over a network is disclosed. A client computer contains a client object which can call an interface on a server object located on a server computer. On the server side, the RPC dispatching layer is circumvented by providing a pointer into the DCOM dispatching layer directly from the RPC utility layer. The client can therefore specify an interface using only an interface pointer identifier, and need not also specify a RPC interface identifier. The DCOM dispatching can then call the appropriate stub for the interface specified by the client with the interface pointer identifier, while taking advantage of the RPC utility layer to perform security checking, thread management, socket management, and association management.

57 Claims, 12 Drawing Sheets

OTHER PUBLICATIONS

Druschel et al., "*Fbufs: A High-Bandwidth Cross-Domain Transfer Facility*," Proceedings of the 14th ACM Symposium on Operating Systems Principles, pp. 189-202 (1993).

Madukkarumukumana et al., "*Harnessing User-Level Networking Architectures for Distributed Object Computing over High-Speed Networks*," Proceedings of the 2nd USENIX Windows NT Symposium, pp. 127-134 (1998).

Thekkath et al., "*Limits to Low-Latency Communication on High-Speed Networks,*" ACM Transactions on Computer Systems, vol. 11, No. 2, pp. 179-199 (May 1993).

Brown et al., "*Distributed Component Object Model Protocol—DCOM/1.0*," Internet-draft (Jan. 1998).

Microsoft Corporation, "*Microsoft Windows NT Server DCOM Technical Overview White Paper*," (1996).

Compaq Computer Corporation et al., "*Virtual Interface Architecture Specification Version 1.0*," (Dec. 16, 1997).

Microsoft Corporation, "*DCOM Architecture White Paper*," (1998).

Horstmann et al., "*DCOM Architecture*," Microsoft Corporation (Jul. 23, 1997).

Open Group, The, "*DCE 1.1: Remote Procedure Call*," [web page] 1997. opengroup.org/onlinepubs/009629399/chap1.htm. [Accessed Apr. 30, 1999].

IBM Corporation, "*External Sorting Data Movement Reduction Method*," IBM Technical Disclosure Bulletin, vol. 31, No. 10, pp. 85-85 (Mar. 1, 1989).

IBM Corporation, "*Preallocating Buffers to Receive Replies to a Multicast*," IBM Technical Disclosure Bulletin, vol. 36, No. 3, pp. 29-33 (Mar. 1, 1993).

* cited by examiner

ACCELERATING A DISTRIBUTED COMPONENT ARCHITECTURE OVER A NETWORK USING A MODIFIED RPC COMMUNICATION

CROSS-REFERENCE TO RELATED APPLICATION

This application claims the benefit of U.S. Provisional Application Ser. No. 60/111,788 filed Dec. 11, 1998.

This application is a continuation of U.S. patent application for "Accelerating a Distributed component Architecture Over a Network Using a Modified RPC Communication," Wang et al., inventors, application No. 09/458,138, filed on Dec. 9, 1999.

TECHNICAL FIELD

This invention relates generally to-software communication over a network and, more particularly, relates to acceleration of the interaction of objects over a network.

BACKGROUND OF THE INVENTION

A component object model defines the interactions between computer software components. The advantage of component programming is that it facilitates the use of reusable sections of code. Programs will often provide similar functionality. For example, many modern software applications provide pull-down menu functionality. Computer code that allows a user to pull down a menu on the computer screen can be found in some form in each of these applications. A component providing the same functionality, however, would only need to be written once, and then simply reused by each succeeding application. The time required to create an application, therefore, can be significantly reduced by reusing preexisting components.

For object-based component programming to be successful, a standard method of interactions between objects must be defined. One such standard is the Component Object Model, or COM. COM mandates that all objects interact through interfaces. Each interface is a collection of functions that the object can perform. The object is said to have "exposed" the methods contained in its interfaces, which can then be "called", or used, by another object. Another standard, based on COM is the Distributed Component Object Model, or DCOM. DCOM defines a standard method of interaction between objects that may be located on remote computers connected through a network. DCOM uses a Remote Procedure Call (RPC) model to define a method of communication between objects across a network. The RPC model is independent of the underlying network structure or protocols.

As can be expected, calling an object located on the same computer is faster than calling an object located on a remote computer. This speed difference can be due to a number of factors. The network cables are significantly longer than the leads between the processor and the memory on the local machine. Therefore, the electrical signals simply take longer to reach the remote computer than to reach the object resident in memory on the local machine. A significantly larger factor is the overhead caused by the network protocol. Each data transmission over a network must be encapsulated, and additional information must be added to the packet so that it may be transferred across the network with error correcting capabilities, and so that it may properly be decoded on the remote machine. Furthermore, each packet sent over a network may be accompanied by a flurry of additional network packets performing necessary buffer management and receipt acknowledge functions. These further packets, which comprise the network flow control, also add to the time required to send an object call over a network to a remote computer.

An additional factor contributing to the speed difference between a call to an object resident on the same machine and one resident on a remote machine is the overhead created by DCOM and the RPC model. RPC marshals pointers and data to be transmitted across the network by reading them from the program memory and packaging them for transportation across the network. Marshaling introduces delay because it copies from program memory into an RPC buffer the element that is to be transmitted across the network. Another aspect of the overhead of DCOM and RPC are the runtime layers. The RPC and DCOM runtime layers bridge together the client and server so that the client can make remote calls to the server. This process of bridging the client and server together is known as binding. Binding information can include the Internet Protocol (IP) address, the port number, and the interface identifier (IID).

The combined effects of the marshaling, the additional packets of flow control, and the activities of the runtime layers result in a dramatic decrease in the performance of DCOM over a network. In fact, compared to a raw network application which directly sends data across the network, the DCOM overhead can decrease performance by a factor of three or more.

SUMMARY OF THE INVENTION

Accordingly, the present invention provides a method for increasing the efficiency of calling remote objects over a network using DCOM.

The present invention also provides a more efficient method of marshaling DCOM application data.

The invention additionally provides a method for maximizing the efficiency of RPC flow control.

The invention also provides for a more efficient binding between the client and the server.

An object model, such as DCOM, can allow communication across a network by making the network communication transparent to the client and server objects. DCOM uses a "proxy" on the client process and a "stub" on the server process to achieve such transparency. The proxy acts as a local version of the server object which the client can call, and the stub acts as a local client object on the server. The proxy and stub then communicate with one another across the network. To perform this communication, the proxy marshals the call parameters into an RPC buffer, from which they are transferred across the network to the stub. The stub unmarshals the call parameters, and calls the server object directly. Similarly, on the return, the stub marshals the call results into an RPC buffer for transmission across the network to the proxy, which unmarshals the results and returns them to the client process.

The present invention allows DCOM systems using a network interface card (NIC) with "scatter-gather" ability to gather elements from various memory locations to avoid copying the call parameters into the RPC buffer. Instead, the proxy or stub simply create a pointer list in the buffer, which is then accessed by the NIC, which can collect the elements from memory and is responsible for sending the data across the network. To indicate that the RPC buffer contains only a list and not the actual values themselves, the proxy or stub can set a flag, which is understood by the NIC or RPC runtime. On the server side, the stub code can hold onto the buffer and not clear it until the NIC has finished sending the data. In such a case, a callback function can be used by the NIC to indicate that it has completed sending the data.

Another method of improving the network performance of an object model such as DCOM is to make more efficient the communication between a client and a server through the RPC layer. DCOM was designed to take advantage of the existing architecture of RPC, provides a mechanism for making calls to remote computers connected by a network. When a local RPC object seeks to call a remote RPC interface, the call can specify the IP address, the port number and the RPC IID. DCOM takes advantage of the RPC structure, except that DCOM uses an interface pointer identifier (IPID) to uniquely specify the COM interface to which the call is being made. In order to use the RPC structure, the DCOM client object must send an RPC IID to the RPC runtime layer and an IPID to the DCOM runtime layer. Because the IPID is more specific than the RPC IID, the RPC IID is redundant and the additional computation performed by the RPC layer is wasted.

The present invention removes the additional computation and communication performed by RPC and allows the DCOM client to send only an IPID. The RPC dispatching layer on the server side is removed from the critical path. All incoming DCOM calls are forwarded to the DCOM dispatching layer directly. The client side can then be modified, so that the calling DCOM object only needs to send an IPID. The removal of the RPC dispatching allows DCOM communication to proceed without a duplication of effort, and therefore more efficiently.

Yet another method of improving DCOM performance involves modifying the flow control performed by the software protocol stacks. When transmitting data, a buffer on the receiving side must be made available before each packet of data can be sent. Furthermore, the sender must know that the receiver has made a buffer available, using some form of flow control, before sending a message. With traditional transport layers, the sender waited for an explicit "OK TO SEND" flow-control message, thereby insuring that the receiver had sufficient resources to accept the data the sender was waiting to transmit. In the worst case, which can be typical for RPC and DCOM communication, the sending of each data packet requires the sending of one flow control packet, flow control packets account for one half of the network traffic. More importantly, the waiting computer does no useful work while waiting for the "OK TO SEND" flow control message. Such idle time reduces the efficiency of the overall system.

The present invention modifies the RPC transport layer to use an implicit flow control. Implicit flow control does not require an explicit communication from the receiver indicating it is ready to receive; such as an "OK TO SEND" message. Rather, implicit flow control insures that the receiver is ready to receive by implicitly associating flow control messages with regular application messages. The present invention allows a sending computer to pre-post a receive buffer prior to sending out any data that may cause a response message to be sent from the receiving computer. Therefore, when the receiving computer receives the data from the sending computer, it is an implicit acknowledgement that the sending computer is ready to receive. By pre-posting the receive buffer prior to sending any data, the sending of data becomes an indication that the next receive buffer is ready. Thus, the regular application messages can be considered flow control messages. Such a system eliminates the overhead due to the standard flow control by relying on the request/reply semantics of RPC communication. Additionally, the flow control of the present invention minimizes the idle time of the sending and receiving computers. By removing the explicit flow control messages, the present invention allows computers to reorganize their send and receive cycles to minimize idle time, and thereby maximize efficiency. Note that the present invention is more efficient than prior systems, such as the standard TCP protocol, which piggyback explicit flow-control messages on outgoing application messages as often as possible. For example, the TCP heuristics to piggyback explicit flow control-messages fail to optimize flow-control in request-reply traffic between client and server, which is exactly the traffic for RPC, DCOM, and HTTP.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
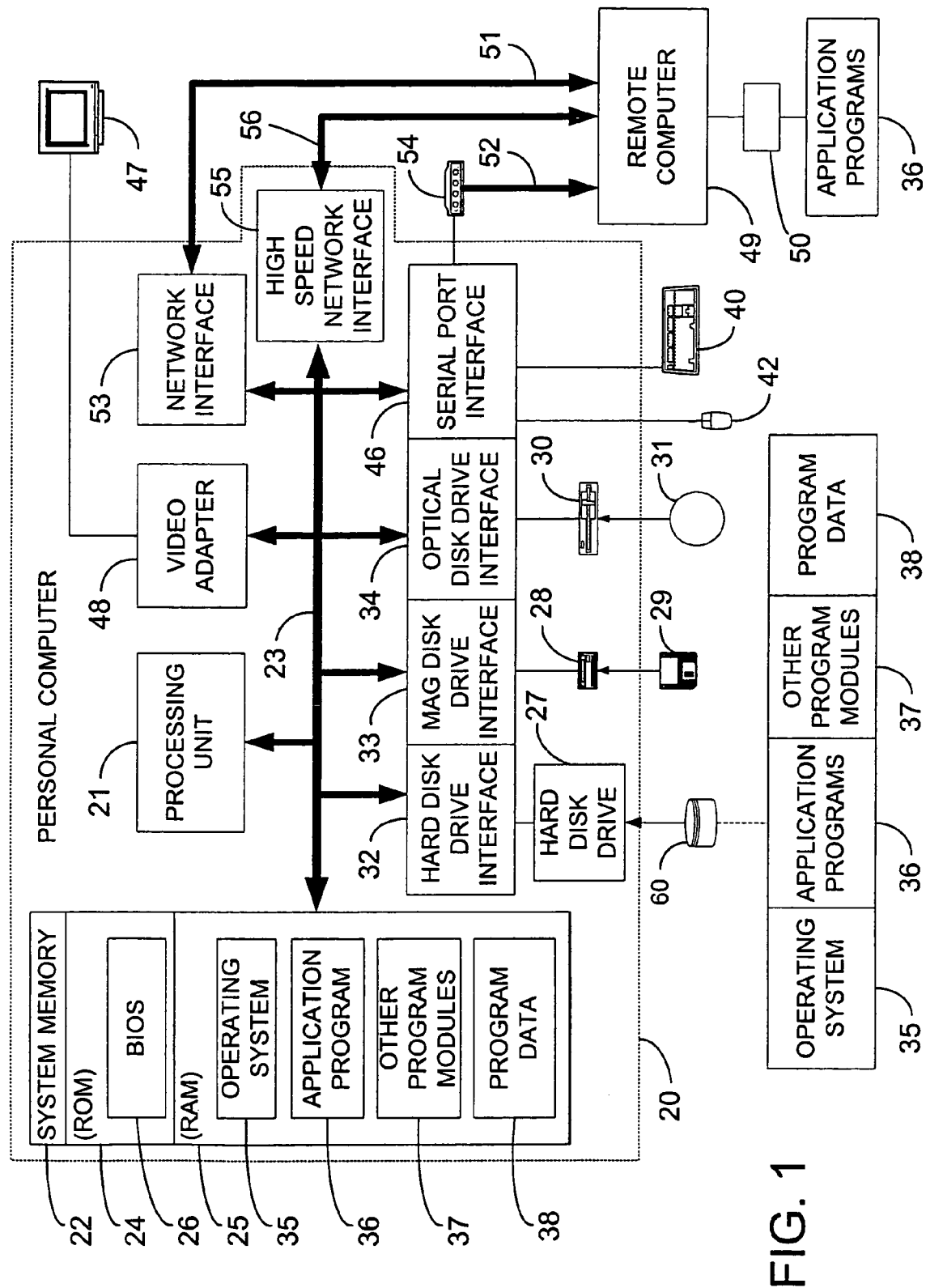
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory-storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51, a wide area network (WAN) 52, and a high-speed system area network (SAN) 56. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. When connected to a SAN, the personal computer 20 is connected via a high-speed network interface 55. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
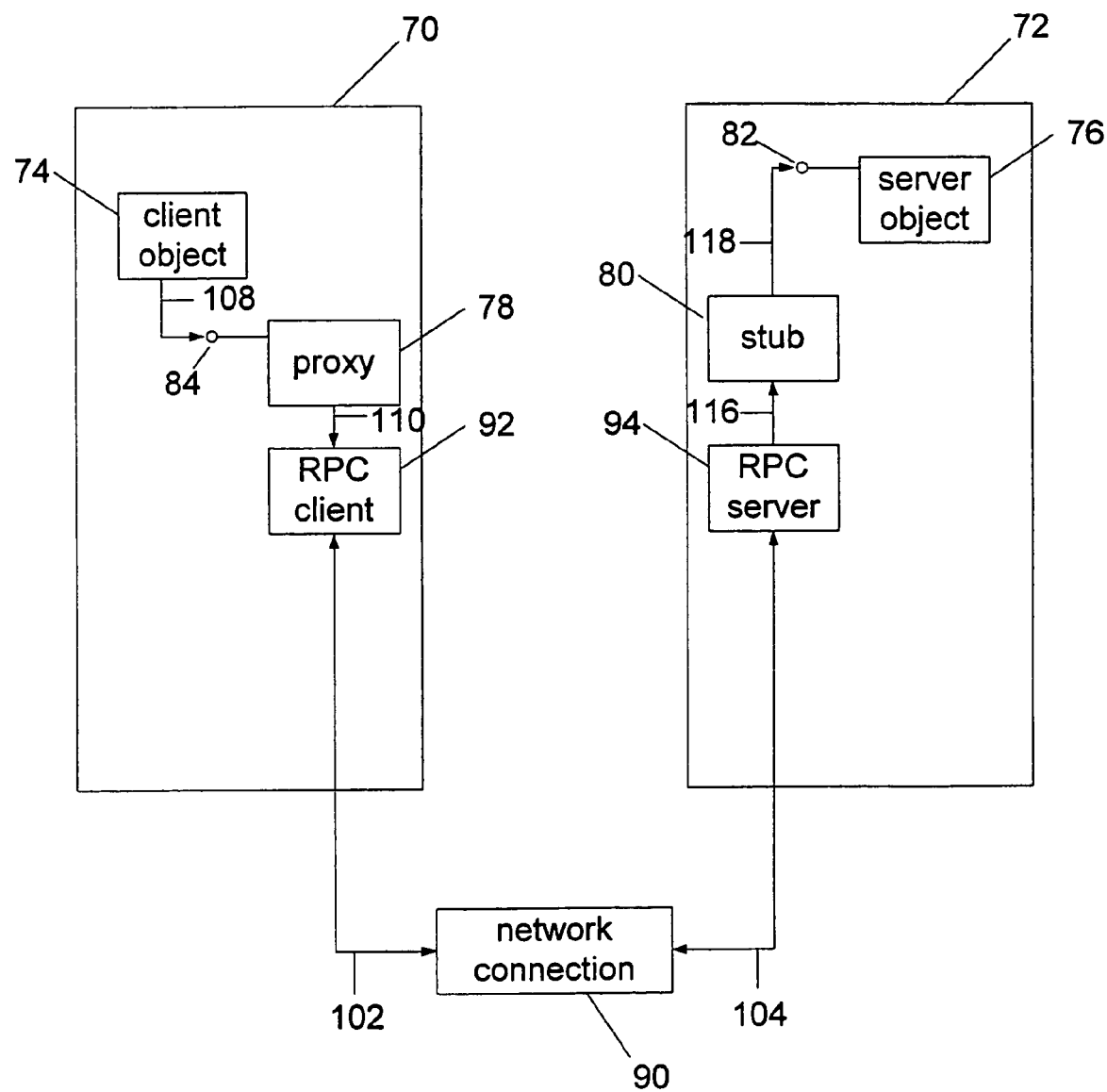
FIG. 2 is a block diagram generally illustrating the operation of DCOM over an exemplary network and computers.

In accordance with the invention, the interactions of a distributed object model are shown in FIG. 2. An object model can define a standard set of rules governing the interaction of "objects", such as objects 74 and 76. An object, as is known by those skilled in the art, is a computer program element comprising computer readable instructions and computer readable data. Objects can be very useful in the programming arts because users can use previously programmed objects to create an application, instead of writing all of the code themselves. Objects, therefore, allow for efficient code reuse. Once an object is created to perform specific tasks, any user can use that object to perform those tasks. Thus, to implement common functionality across different computer applications, the software author need only create an object with that functionality once, or even find an object created by another, and then simply use it in each application.

An object model, such as the Component Object Model (COM) from Microsoft Corporation, seeks to define a set of standards so that objects written by one individual can be used by all, without any changes to the object, and even without understanding how the object is implemented internally. To accomplish this, object models can require objects to implement interfaces. As will be known by one of skill in the art, an interface, such as interface 82 of object 76, is a set of functions provided by the object which a client of the object can request. A client of an object can only interact with an object through that object's interfaces. Therefore, if an object is capable of performing a certain task, a function for that task will exist in one of the object's interfaces. To request that the object perform a task, the client of the object can select an interface and make a call to the appropriate function. Because clients can only interact with an object through its interfaces, the specific structure and internal workings of the object are irrelevant.

Due to the increasing popularity of networked computing, it is desirable that objects can interact with one another over a network. To maintain compatibility, and not require rewriting, an object model which seeks to allow implementation across a network can provide some mechanism for transparent network communication. As seen from the client's perspective, there should be no difference between calling an object on a local computer and an object on a remote, networked computer. One such object model, the Distributed Component Object Model (DCOM) from Microsoft Corporation, uses a "proxy" in the client process and a "stub" in the server process to achieve such transparency.

Turning again to FIG. 2, an interface 82 is shown exposed by server object 76. As can be seen, server object 76 resides on server computer 72. Server computer 72 and client computer 70 are connected through a network connection 90, which can be a SAN 56. In order to allow client object 74, resident on client computer 70, to call interface 82 of the server object 76, DCOM creates a proxy 78 on the client computer and a stub 80 on the server computer. The proxy 78 on the client computer 70 acts as the client-side representative of the server object 76 by exposing an interface 84 analogous to interface 82 exposed by the server object. The client object 74 can therefore call interface 84 in exactly the same manner it would call any local interface. Once the client object 74 calls interface 84, the proxy 78 transfers the call across the network connection 90 to the stub 80. It is the stub 80 which then calls the actual interface 82 of the server object 76. The server object 76 can respond in an analogous manner by sending the reply data to the stub 80 and having the stub transfer it across the network connection 90 to the proxy 78, which then presents the data to the client object 74. Therefore, because the proxy 78 and the stub 80 are both located on the same machine as the objects with which they communicate, they allow those objects to make calls and return data in exactly the same manner as they did in a local context. The proxy 78 and stub 80 then package the calls and data and send them across the network, allowing for a distributed object system. The proxy 78 and stub 80, therefore, make the network transparent to client object 74 and server object 76.

Figure 3A:
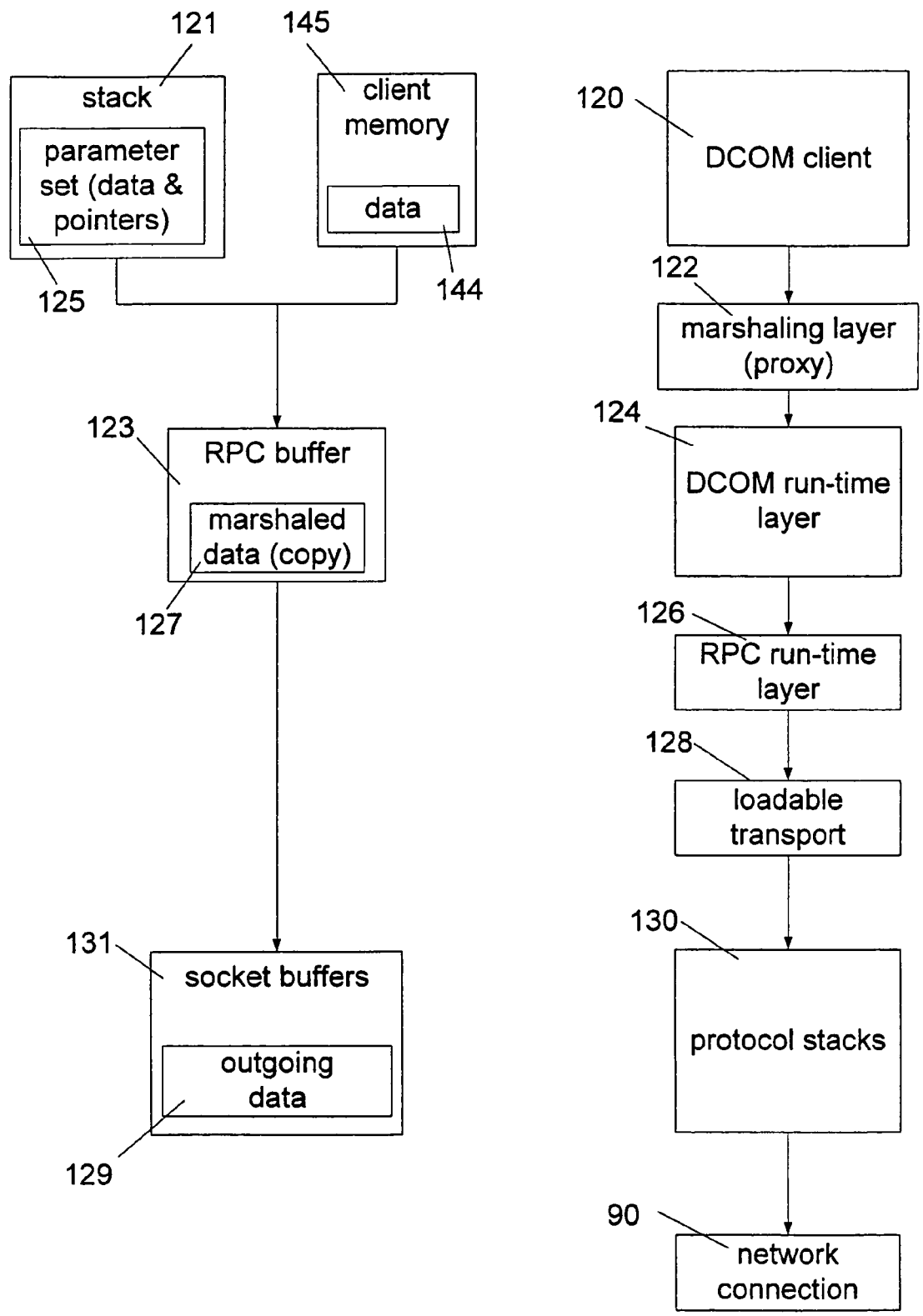
FIG. 3A is a block diagram generally illustrating the layers of DCOM on a client and the transfer of data from a client to a server.
Figure 3B:
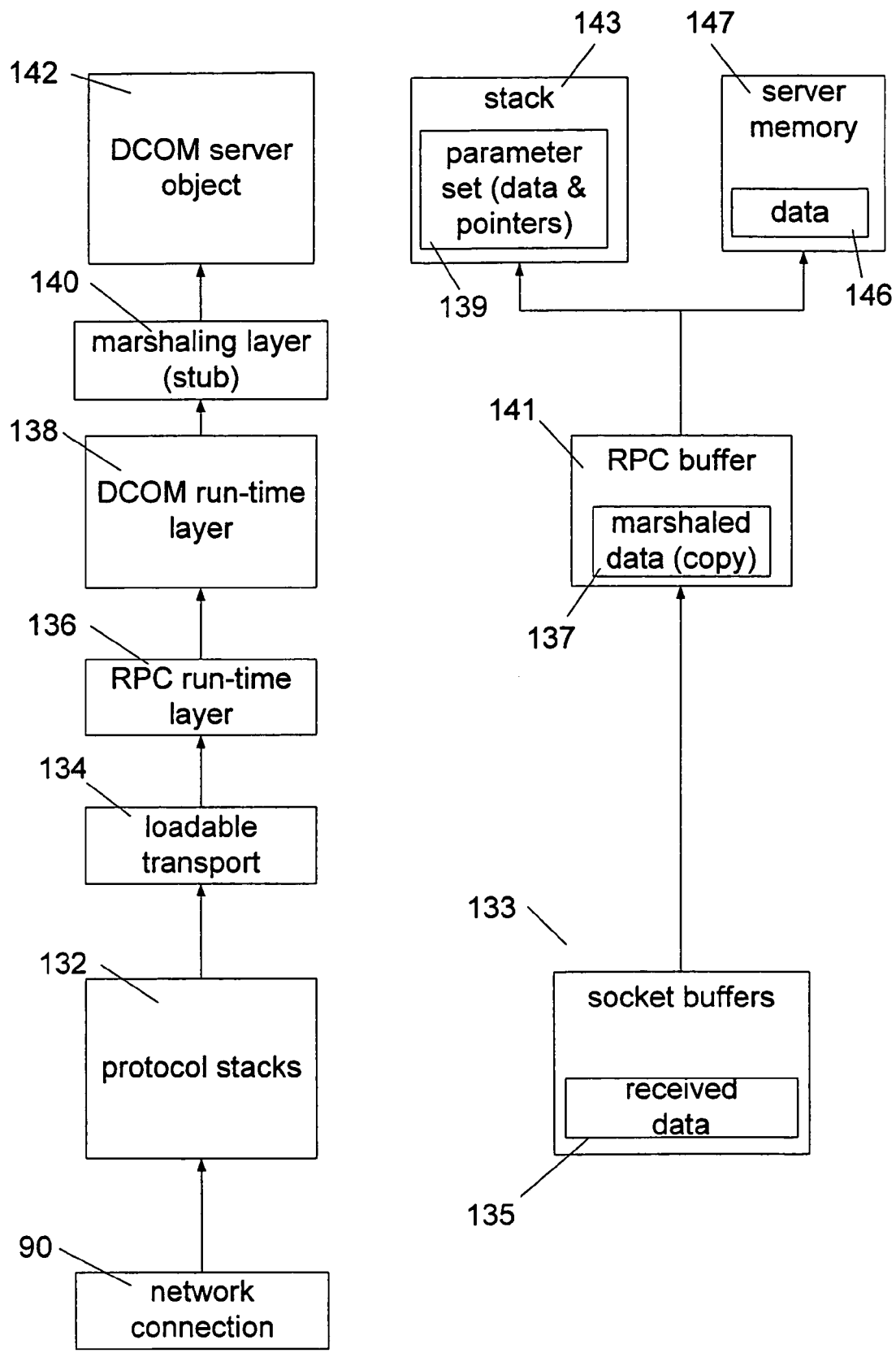
FIG. 3B is a block diagram generally illustrating the layers of DCOM on a server and the transfer of data from a client to a server.

A known layered architecture of DCOM is shown in FIGS. 3A & 3B. As shown in FIG. 3A, when the DCOM client 120 makes a remote call, the marshaling layer 122 prepares the call for transmission across the network. The proxy 78 acts as the marshaling layer 122 on the client 70 and the stub 80 acts as the marshaling layer 140 on the server 72. Marshaling, as will be explained in more detail below, is the packaging of the call for transmission across the network connection 90. After the marshaling layer 122 marshals the call, the DCOM run-time layer 124 transmits the call over the network. The DCOM run-time layer 124 transmits the call by invoking the functionality of the Remote Procedure Call (RPC) run-time layer 126. DCOM's structure allows it to take advantage of the existing structure of RPC, as will be explained below. The loadable transport layer 128 allows the systems above it to run on any number of different protocols, which are implemented in the protocol stacks 130. The protocol stacks 130 then create the packets sent out over the network connection 90. On the server side, shown in FIG. 3B, the protocol stacks 132 receive the packets, translate them, and pass them to the loadable transport layer 134, which further translates the data into a form which the RPC run-time layer 136 can accept. The RPC run-time layer 136 then accepts the communication, and creates a binding if the call is the first call to an interface. The DCOM run-time layer 138 accepts the communication from the RPC run-time layer 136 and passes it to the stub 80 at the marshaling layer 140. The stub 80 unmarshals the parameters of the call and initiates the call to the DCOM server object 142.

The present invention provides for a number of improvements in this layered architecture; removing overhead, and increasing the speed of DCOM over the network connection 90. One such improvement can be made at the marshaling layers 122 and 140. Marshaling is the process of arranging the data provided by the DCOM client 120 when it calls the DCOM server object 142 into a proper form for transmission across the network connection 90. Simple data types such as characters and integers are not difficult to marshal. However, DCOM often passes more complex parameters, such as arrays of information. RPC can use a standard format called the Network Data Representation (NDR) to marshal the data. DCOM, since it is built on top of RPC, as shown in FIGS. 3A & 3B, can leverage RPC's functionality, such as the use of the NDR standard format. As is known by those of skill in the art, the NDR standard is a "receiver makes right" standard. Should any translation of the data be necessary for a client computer and a server computer to communicate, it is the receiver's responsibility to convert the data into the format it requires. Thus, it is the receiver which makes the data format "right" for itself. The sender, therefore, need not perform any conversion on the data.

With reference again to FIGS. 3A & 3B, the marshalling layer 122, in FIG. 3A, using the NDR standard, marshals data 144 by reading parameters, such as pointers to arrays, or pointers to integers, placed by the DCOM client 120 onto the memory stack 121 of the client computer 70. As is known by those skilled in the art, a call to a function passes parameters including immediate data values, such as integers or floating-point numbers, and pointers to additional data, such as pointers to arrays of data, pointers to text strings, or pointers to complex data structures. Therefore, when the DCOM client 120 makes a call to the DCOM server 142, it places onto the stack 121 a parameter set 125 include immediate data and pointers for the current call. The pointers in the parameter set 125 on the stack 121 point to the data 144 which is in the client computer memory 145. The marshalling layer 122 first determines the required size of the RPC buffer for holding all marshaled data and the DCOM header, and requests such a buffer 123. Then it copies any immediate data in the parameter set 125 into the buffer. It also traverses all of the pointers in the parameter set 125 to retrieve all the data 144 and copies them into the RPC buffer so that the call can be properly unmarshaled by the marshaling layer 140, in FIG. 3B. The DCOM run-time layer 124 adds the DCOM header and passes the buffer to the RPC run-time layer, requesting that the data be sent across the network. As will be known by one skilled in the art, an additional copy 129 may be made by the operating system and placed into a protected-mode socket buffer 131 for transmission across network connection 90. At the server side, shown in FIG. 3B, the transmitted data 135 may be delivered into a protected-mode socket buffer 133 and from there into the RPC buffer 141. The marshaling layer 140 unmarshals the marshaled data 137 from RPC buffer 141 into the parameter set 139 and the server memory 147 on the server computer 72. After the pointers in the parameter set 139 on the stack 143 have been recreated, the call made by the DCOM client 120 can then be made by the stub 140 to the DCOM server 142.

As described above, to perform marshaling, the proxy 122 copies immediate data from the parameter set 125 and additional data 144 to an RPC buffer 123 for transmission. This buffer holds a duplicate 127 of the parameter set 125 and data, since the parameter set is still resident in the stack 121 and the data is still resident in the memory 144 from which it was copied. The present invention contemplates a direct marshaling which stores only a list of pointers to the memory locations of the data (either in the parameter set 125 or additional data 144) in the RPC buffer, rather than duplicating the data itself. As is known by those of skill in the art, a pointer is generally of much smaller memory size than the data it points to, especially in the case of pointers to large data arrays. Therefore, the speed at which the proxy 122 and the stub 140 could marshal and unmarshal the parameters would be increased by copying only pointers into the RPC buffer.

Certain network interface cards (NICs) provide for the ability to perform scatter-gather operations. One example of a network which can use the scatter-gather functionality of such a NIC is a network based on the Virtual Interface Architecture (VIA), which is an instance of a SAN. VIA allows network user-mode applications to directly request a scatter-gather mode of transmission without incurring the extra cost of a copy into a protected-mode buffer. The gathering and the sending of the data is performed directly by the NIC and requires no intervention by the host processor, thereby eliminating the kernel-mode protocol stacks 130 and 132. Furthermore, the request to send and receive data is presented by the user-mode application directly to the NIC without transitioning into the operating system kernel and associated device drivers.

Figure 4A:
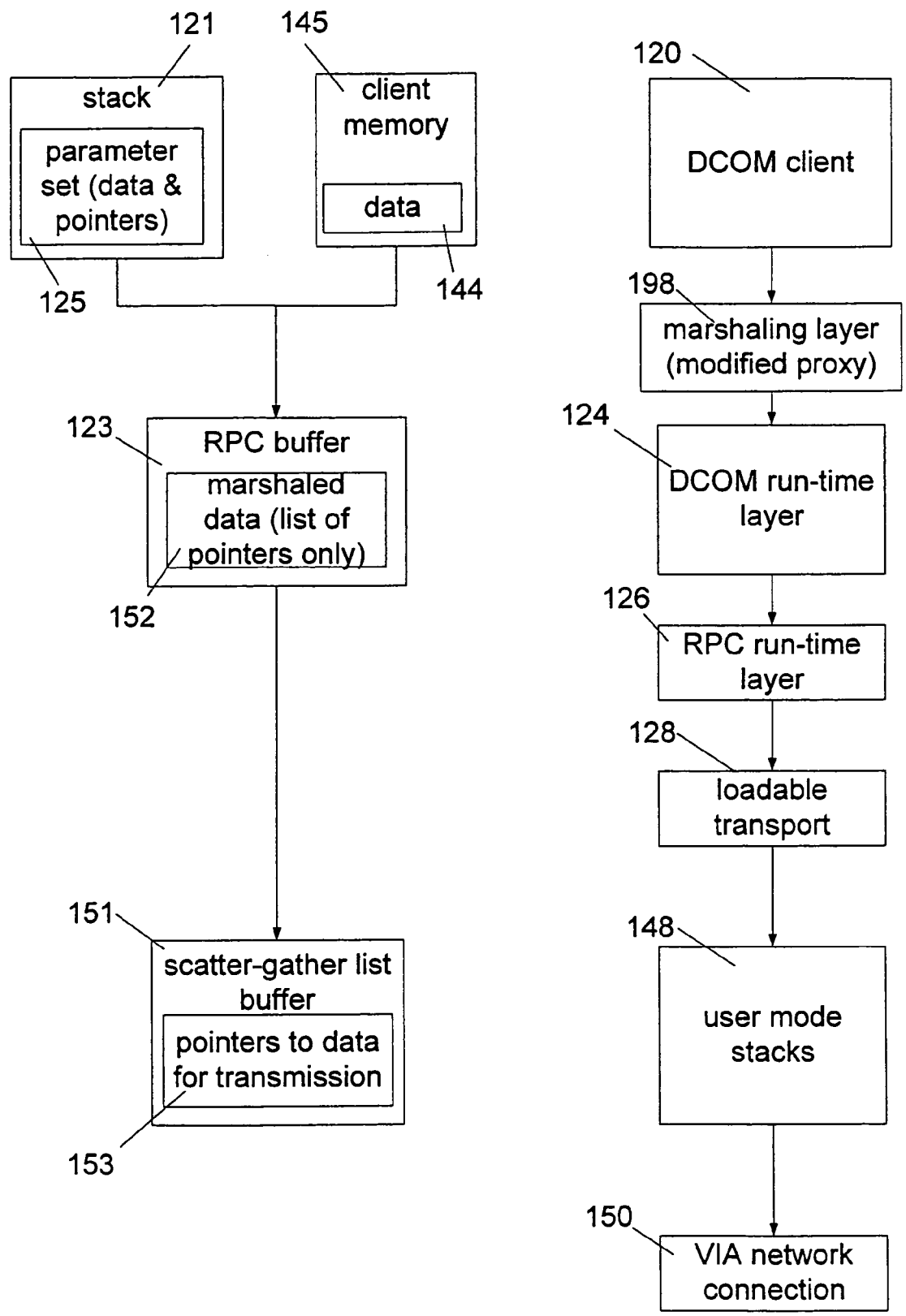
FIG. 4A is a block diagram generally illustrating the layers of DCOM on a client and the transfer of data from a client to a server according to one aspect of the present invention.
Figure 4B:
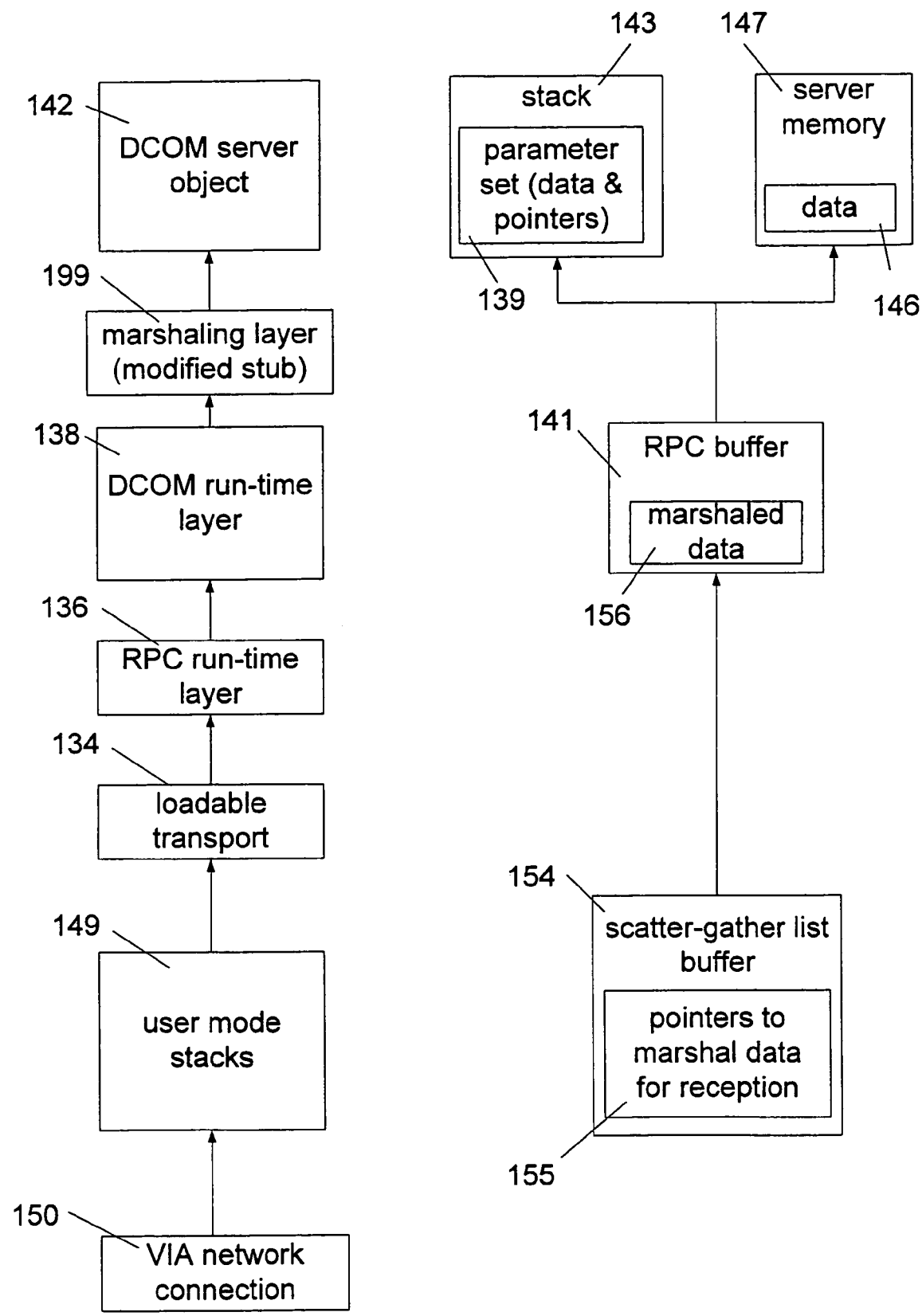
FIG. 4B is a block diagram generally illustrating the layers of DCOM on a server and the transfer of data from a client to a server according to one aspect of the present invention.

In accordance with the invention, and turning to FIGS. 4A & 4B, a modified proxy 198 marshals a list of pointers 125 into the RPC buffer 123. An RPC flag can be added to the modified proxy 198 and stub 199, described in more detail below, to allow them to inform the RPC run-time layers 126 and 136 that the RPC buffers 123 and 141 contain only a list of pointers to memory. The DCOM runtime layers 124 and 138, as described above, can use the RPC layers to communicate the call parameters across the network. Therefore the DCOM layers only pass the flag indicating that direct marshalling is used, after adding or removing the DCOM header to or from the packet, in a manner analogous to that of the known system described above. The RPC runtime layers 126 and 136, however, can be modified to accept a larger data structure from the modified proxy 198 and stub 199. The larger data structure can accommodate the flag set by the modified proxy 198 and stub 199. If the flag is set, the RPC run-time layers 126 and 136 interpret the data 152 and 156 as a list of scatter-gather entries, each comprising a starting memory address of the data they point to and the length of the data. As shown in FIG. 4A, the RPC run-time layer 126 adds RPC headers to the list 152 and passes it to the loadable transport layer 128. The loadable transport layer 128 then passes the list to the user mode stack 148, which implements the implicit flow control, described in more detail below. The user mode stack 148 stores the list 153 in a list buffer 151. The NIC, at the VIA network connection layer 150, gathers the immediate data from the parameter set 125 and additional data 144, both pointed to by the list 153, out of the stack 121 and the client memory 145 and transmits it across the network.

On the receiving side, shown in FIG. 4B, since the servers-side RPC runtime may receive calls on any methods supported by the server process, it is in general not possible to specify a receive scatter list for any arbitrary method in advance. However, since the receiving RPC buffer is dedicated to the on-going RPC call for its entire duration, the stub code and the server object can use the data in the RPC buffer directly without first copying the data into the data 146 in server memory 147, unless data format conversion is required.

Figure 5A:
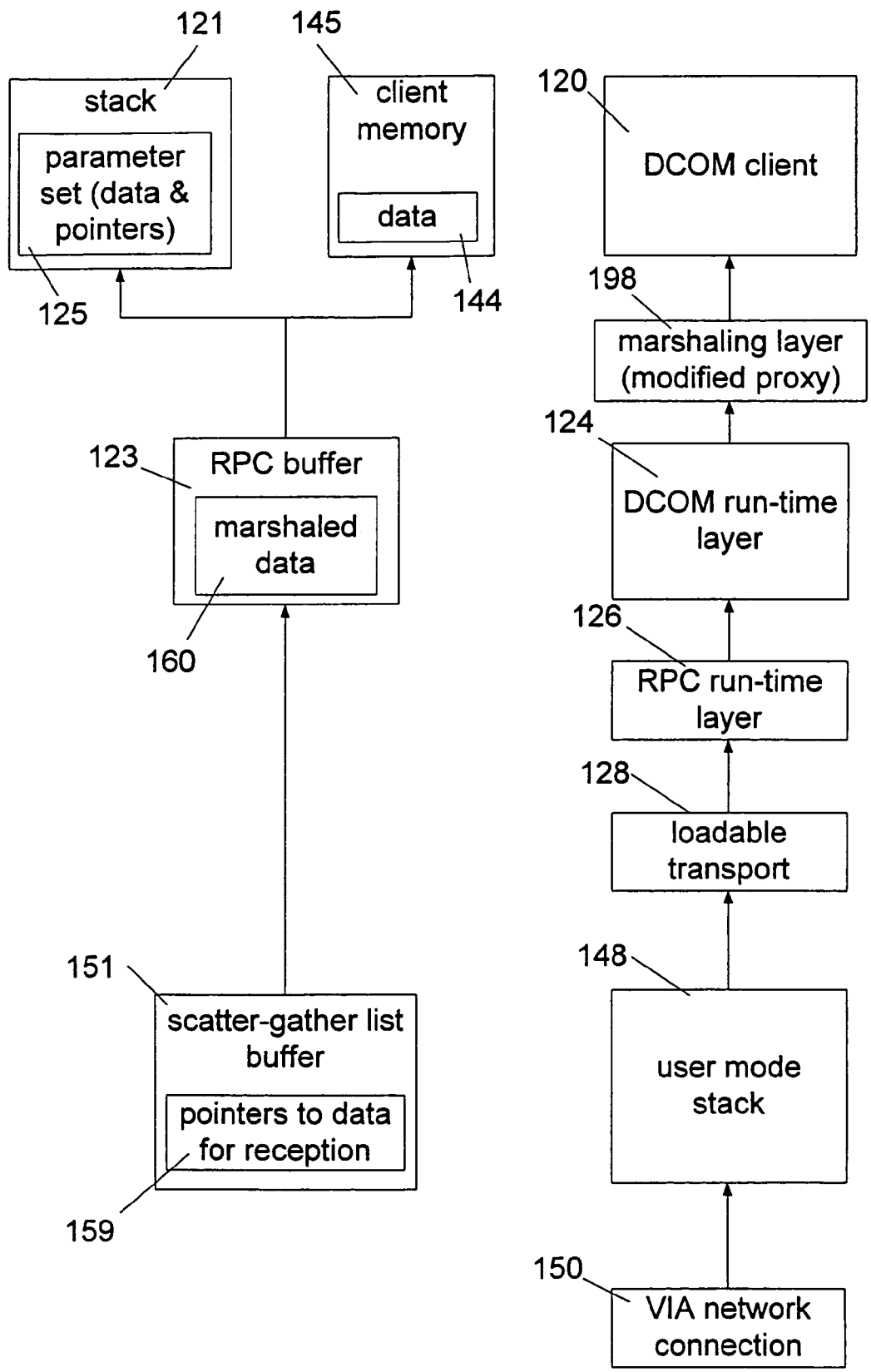
FIG. 5A is a flow chart generally illustrating the layers of DCOM on a client and the transfer of data from a server to a client according to one aspect of the present invention.
Figure 5B:
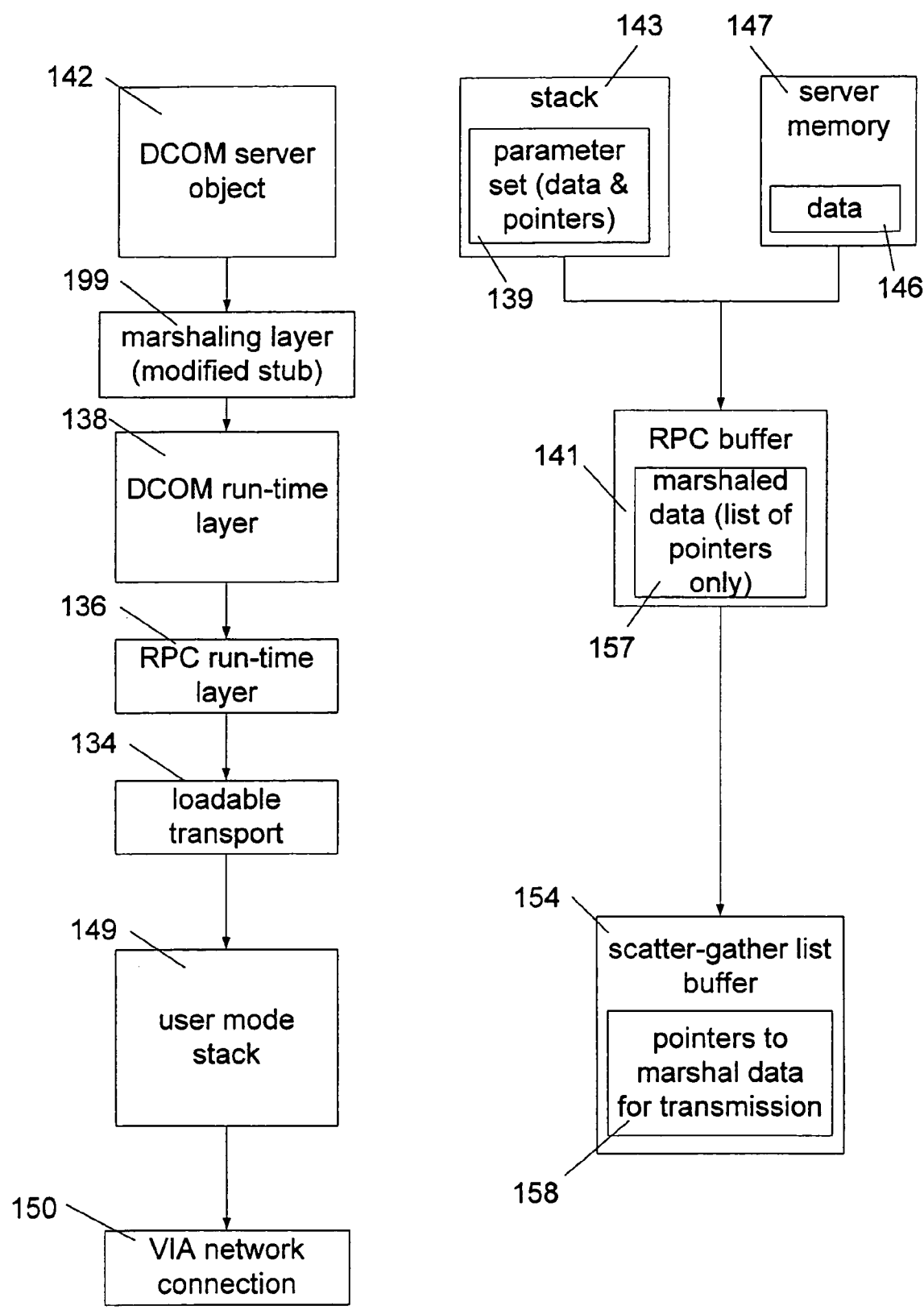
FIG. 5B is a flow chart generally illustrating the layers of DCOM on a server and the transfer of data from a server to a client according to one aspect of the present invention.

Turning to FIGS. 5A & 5B, a response from the DCOM server object 142 to the DCOM client 120 is shown. As shown in FIG. 5B, a modified stub 199 marshals a list of pointers 157 into an RPC buffer 141. The list of pointers 157 contains entries for any immediate return data in the return parameter set 139 and any additional data 146 in server memory 147. An RPC flag can be added to the modified proxy 198 and stub 199, as described above, to allow them to inform the RPC run-time layers 126 and 136 that the RPC buffers 123 and 141 contain only a list of pointers to memory. In a manner analogous to that described above in reference to FIGS. 4A & 4B, the DCOM run-time layer 138 can add a DCOM header to the list. The RPC run-time layer 136 can then add RPC headers to the list 157 and pass it to the loadable transport layer 134. The loadable transport layer 134 then passes the list to the user mode stack 149, which implements the implicit flow control, described in more detail below. The user mode stack 149 stores the list 158 in a list buffer 153. The NIC, at the VIA network connection layer 150, gathers all the data pointed to by the list 158 and transmits it across the network.

Because the NIC performs the gather and send operation directly from the server memory 147, the DCOM server 142 should delay clearing the memory 147 until after the NIC has finished gathering and transmitting the data. If the DCOM server object 142 were to clear the memory prior to the completion of the send operation, the NIC would not be able to gather the appropriate data 146 pointed to by the pointers 158. To insure that the DCOM server object 142 does not prematurely clear data 146 but can still reclaim the memory after its usage, a callback function can be implemented at the marshaling layer 199 to be invoked by the loadable transport layer 134. Initially, when the modified stub 199 intends to use the direct marshalling, it passes down to the loadable transport layer 134 a context pointer and a function pointer to the callback function. The loadable transport layer 134 then calls the callback function by supplying the context pointer as a parameter to indicate that the sending of the data 146 has completed.

On the receiving side, shown in FIG. 5A, if the client knows the size of each piece of the returning data when it makes the call, it can pass down a list of pointers for scattering in 159. In this case, when the NIC receives the transmitted data, it can scatter it directly into data 144 in client memory 145, as instructed by the list of pointers 159. If the size of the returning data cannot be determined beforehand, the incoming data needs to be received by the RPC buffer 123 first. Unlike the server side, it is undesirable for the client to use the data from buffer 123 directly because the client may need to hold on to the data beyond the end of current call. Therefore, the data 160 in buffer 123 needs to be copied to data 144 in client memory 145 so that the RPC buffer 123 can be released.

The proxy 78 and stub 80 shown in FIG. 2 implement standard marshaling. Should a user choose to do so, they could write a modified proxy 198 and stub 199 to perform the direct marshaling of the present invention, as disclosed above. One method for doing so is to manually replace the copy marshalling code with code which constructs a scatter-gather list and to move the buffer release code into an added callback function. The pointer to the buffer, the context pointer, and the pointer to the callback function, as described above, are passed to the RPC run-time layer and loadable transport layers. Those layers, as also described above, can then invoke the callback function by supplying the context pointer as a parameter when the buffer can be released. An alternative method for generating a modified proxy 198 and stub 199 to perform the direct marshaling of the present invention would be to use an IDL compiler. An interface can be described by the Interface Definition Language (IDL). As is known by those skilled in the art, once an interface is defined in IDL, an IDL compiler can create the code for both a proxy and a stub capable of marshaling the defined interface. One such IDL compiler is the Microsoft IDL (MIDL) compiler from Microsoft Corporation. The IDL compiler could be modified to automatically produce a proxy and stub capable of providing such direct marshaling. Alternatively, a command-line flag could be provided to indicate that direct marshalling is requested.

As can be seen, the present invention reduces the number of copies on the client side when calling an interface by marshaling only a list of pointers into the RPC buffer 123 and allowing the network to access the data directly. On the server side, the received data can be retained in the RPC buffer 141, without copying to memory 147. Additionally, such lists of pointers can be used to eliminate a copy on the server side when sending a response from the DCOM server 142, and when receiving the response on the client side. The elimination of these copies results in a more efficient transfer process from the DCOM client 120 to the DCOM server 142 and from the server to the client.

Figure 6:
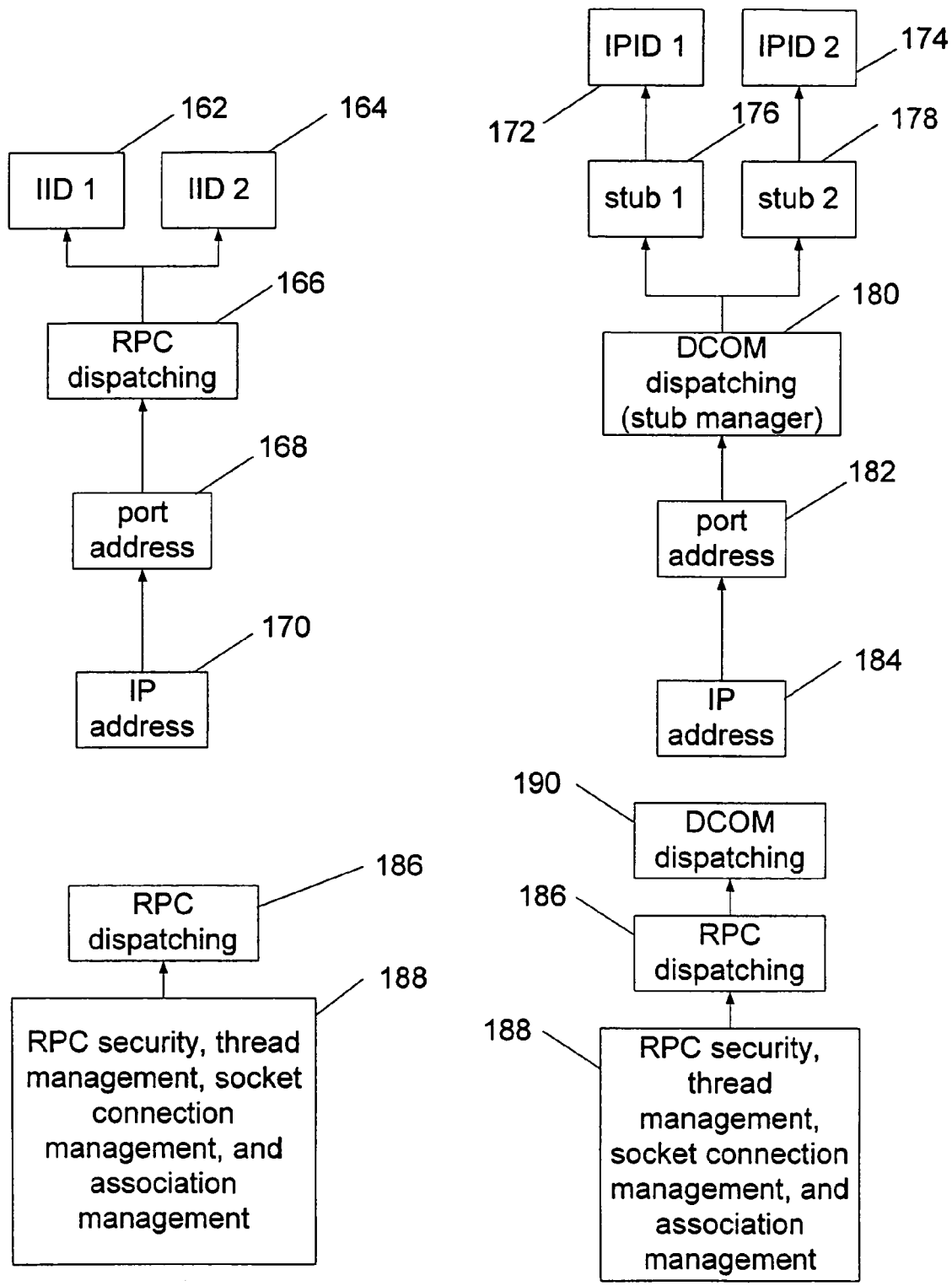
FIG. 6 is a block diagram generally illustrating the operation of RPC dispatching and DCOM dispatching.

An additional optimization contemplated by the present invention is the removal of dispatching redundancies between the DCOM run-time layers 124 and 138 and the RPC run-time layers 126 and 136. As is known by those skilled in the art, dispatching is the process by which the called interface is located by the server computer 72. Generally dispatching identifies an interface with succeeding levels of specificity. Turning to FIG. 6, RPC dispatching and DCOM dispatching on the server computer 72 are illustrated. In order for a call from an RPC client to arrive at the correct server computer 72, the call can specify the Internet Protocol (IP) address of the server to which it is making the call. Each server can then have multiple port address on which a call can be made, and a port address can be specified in the call. The call can also specify the interface identifier (IID) of the RPC interface to which the call is made. Multiple interfaces can be called through a single port. Thus, as shown in FIG. 6, the server 72 first checks the IP address at step 170. If the IP address corresponds to the server 72, the server checks which port address is specified in the call at step 168. Once the port address is determined, the server can pass the call to the appropriate RPC dispatching at step 166 which, depending on whether IID1 or IID2 was called can direct the call to interface IID1 at step 162 or interface IID2 at step 164.

DCOM dispatching is performed in a similar manner, since DCOM is layered on top of RPC, as can be seen from FIGS. 3A, 3B, 4A, 4B, 5A, and 5B. As shown in FIG. 6, the server 72 first checks the IP address at step 184. If the IP address corresponds to the server 72, the server checks which port address is specified in the call at step 182. Once the port address is determined, the server can pass the call to the appropriate DCOM dispatching element at step 180. Unlike RPC, however, a single DCOM object, such as object 76 in FIG. 2 can have multiple interfaces, such as interface 82. Because each interface has a unique interface identifier (IID) only within the object providing that interface, it is possible for two interfaces of two separate DCOM objects to have an identical IIDs. Furthermore, because multiple DCOM objects can be called through a single port, it is possible for two interfaces of two separate DCOM objects, each of which can be called through the same port, to have an identical IIDs. Therefore, to uniquely identify an interface in such an environment, DCOM can use an interface pointer identifier (IPID). The IPID is a combination of the IID of the interface, and the object identifier (OID) of the object providing the interface. In such a manner, the IPID can uniquely identify the interface by referencing both the IID and the OID.

Therefore, in FIG. 6, when the server 72 passes the call to the DCOM dispatching element at step 180, the DCOM dispatching element determines the appropriate IPID to which the call is directed. The DCOM dispatching element at step 180 is also known as the stub manager, because it directs the call to the appropriate stub, such as stub 80 in FIG. 2, based on the IPID. Thus, in FIG. 6, if the call was directed to interface IPID1, the stub manager at step 180 can pass the call to stub1 at step 176 to call the interface. Alternatively, if the call was directed to interface IPID2, the stub manager at step 180 can pass the call to stub2 at step 178 to call the interface. As is known by those skilled in the art, a single stub can access multiple interfaces. Thus, it is not required that the stub manager at step 180 invoke a different stub for each call to a different interface.

As can be seen, DCOM relies on an IPID, a combination of an IID and an OID to perform dispatching, while RPC relies only on the IID. Nevertheless, because of the similarities between the two systems, DCOM can be implemented to take advantage of RPC dispatching. The RPC run-time layer 136 implements an RPC dispatching 186 layer, as shown in FIG. 6, and an additional layer 188 to handle further RPC duties. The RPC run-time layer 126 does not implement the dispatching layer 186, as a client computer does not dispatch a call. RPC layer 188 can include RPC security, RPC thread management, RPC socket connection management, and RPC association management. The DCOM run-time layer 138, which implements the DCOM dispatching 190, can be thought of as built on top of the RPC dispatching 186 and the RPC layer 188, as shown in FIG. 6. The DCOM run-time layer 124 on the client computer 70 does not implement dispatching, but can provide DCOM security. To ensure that the RPC run-time layer 126 and 136 is ready to send and receive calls, the DCOM run-time layer 124 can still specify an IID to which the call is directed. In such a way the RPC dispatching 186 on the server 72 can handle a DCOM call as it would an RPC call. However, the DCOM dispatching 190 can use an IPID to uniquely specify the interface to which the call is directed. The RPC IID is therefore redundant, and used solely for the purpose of utilizing the RPC layer 188. Furthermore, when the RPC dispatching 186 receives the IID, it performs additional functions, such as setting up a communication dictionary, which are redundant in light of the DCOM dispatching 190. The redundancy is significant because the functions performed to enable RPC dispatching sometimes require a network communication from the client computer 70 to the server computer 72 and a return communication from the server to the client. As is known by those skilled in the art, communications across a network connection require significantly more time than communications local to the client computer 70.

The present invention, therefore, contemplates removing the use of the RPC IID and the attendant inefficiencies while maintaining the useful RPC security, thread management, socket connection management, and association management. One method for doing so is to remove the RPC dispatching 186 and allow the DCOM run-time layer 124 to specify only an IPID. On the server computer 72, when the RPC run-time layer 136 completes the steps required by the RPC utility layer 188, such as confirming the authenticity of the client computer 70, it performs the RPC dispatching in layer 186. However, as described above, the processing of the RPC dispatching layer 186 is inefficient, as the DCOM dispatching layer 190 will perform its own dispatching when the RPC dispatching is finished. Furthermore, the RPC dispatching layer 186 will only provide a pointer into the DCOM dispatching layer 190. Therefore, the present invention contemplates providing the pointer to the DCOM dispatching layer 190 directly to the RPC utility layer 188. In such a manner, when the RPC utility layer 188 completes its tasks, it can pass the call directly to the DCOM dispatching layer 190.

An additional modification which can be made as a result of the change to the RPC run-time layer 136 described above, is to remove those API calls to the RPC dispatching 186 from the DCOM run-time layer 138. An example of the APIs affected is shown in Table 1 below. As can be seen from the table, the API calls that can be removed are those that perform functions attendant with RPC dispatching.

TABLE 1

| RPC_STATUS RPC_ENTRY RpcServerInqIf( |
| RPC_STATUS RPC_ENTRY RpcServerRegisterIf( |
| RPC_STATUS RPC_ENTRY RpcServerRegisterIfEx( |
| RPC_STATUS RPC_ENTRY RpcServerUnregisterIf( |
| RPC_STATUS RPC_ENTRY RpcServerUseAllProtseqsIf( |
| RPC_STATUS RPC_ENTRY RpcServerUseAllProtseqsIfEx( |
| RPC_STATUS RPC_ENTRY RpcServerUseProtseqIf( |
| RPC_STATUS RPC_ENTRY RpcServerUseProtseqIfEx( |

On the client computer 70, the DCOM run-time layer 124 can be modified by removing the code that sends the IID together with the IPID. Because the server 72 no longer performs RPC dispatching prior to DCOM dispatching, there is no longer a need for the IID. As was described above, the IPID uniquely identifies the interface called, and is (conceptually) composed of a combination of the IID and the OID. Therefore, efficiencies are achieved due to the elimination of repeated tasks between the DCOM run-time layer 138 and the RPC run-time layer 136 on the server machine; most notably the RPC run-time layer 136 no longer performs a round-trip network communication when the call is first initiated.

Figure 7:
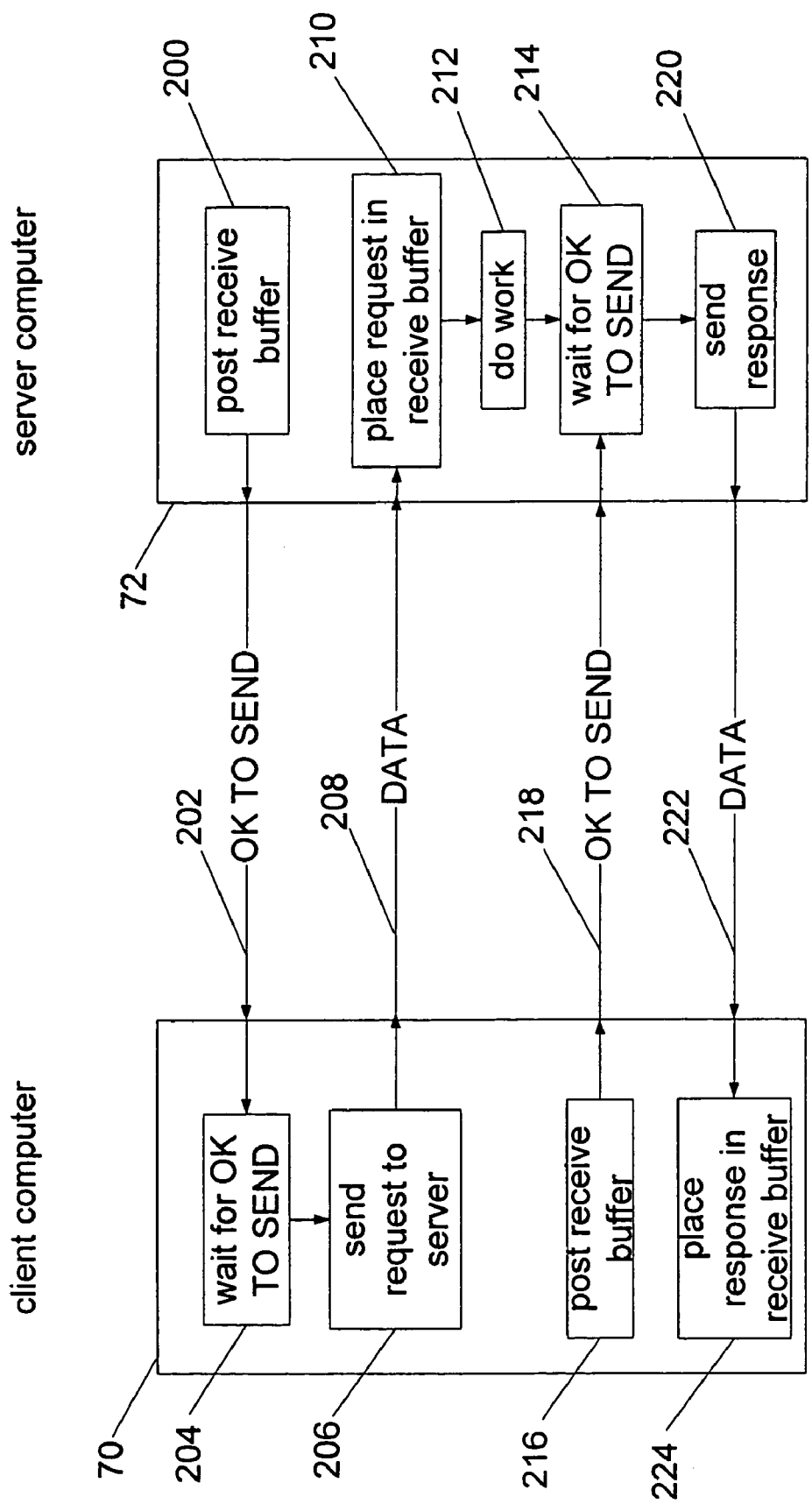
FIG. 7 is a communication flow diagram generally illustrating explicit flow control.

Another improvement to the speed at which DCOM runs over a network can be achieved through a modification of the RPC flow control. Flow control ensures that each packet sent across a network is being expected by the intended recipient. FIG. 7 illustrates a known flow control scheme, which uses an explicit flow control. With such an explicit flow control, the sender must wait until. the receiver signals it is ready to receive prior to sending a packet across the network. Thus, in FIG. 7, the client computer 70 waits at step 204 for the server computer 72 to indicate that it is ready to receive. An OK TO SEND message can be one such indication that the computer is ready to receive. At step 200 the server computer 72 can post a receive buffer. By posting the receive buffer, the server computer 72 is setting aside memory in which to receive whatever data the client computer 70 will send. Meanwhile, at step 204, the client computer 70 is idling, waiting for permission to send the data. Once the server computer 72 has posted the receive buffer at step 200, it can send an OK TO SEND message 202. When the client computer 70 receives the OK TO SEND message 202, it can then proceed, at step 206 to send its request to the server computer 72. The request is sent as data 208, which is received by the server computer and placed in the receive buffer at step 210. Once the request has been received, the server can perform whatever work is required by the request at step 212. When the server computer 72 has finished the work which was requested by the client, it idles, at step 214, waiting for the client to signal that it is ready to receive. The client computer can post its receive buffer at step 216, and can then send an OK TO SEND message 218. When the server receives the OK TO SEND message 218, it can send its response to the client's request at step 220. The response data 222 is received by the client and can be placed in the receive buffer at step 224.

Figure 8:
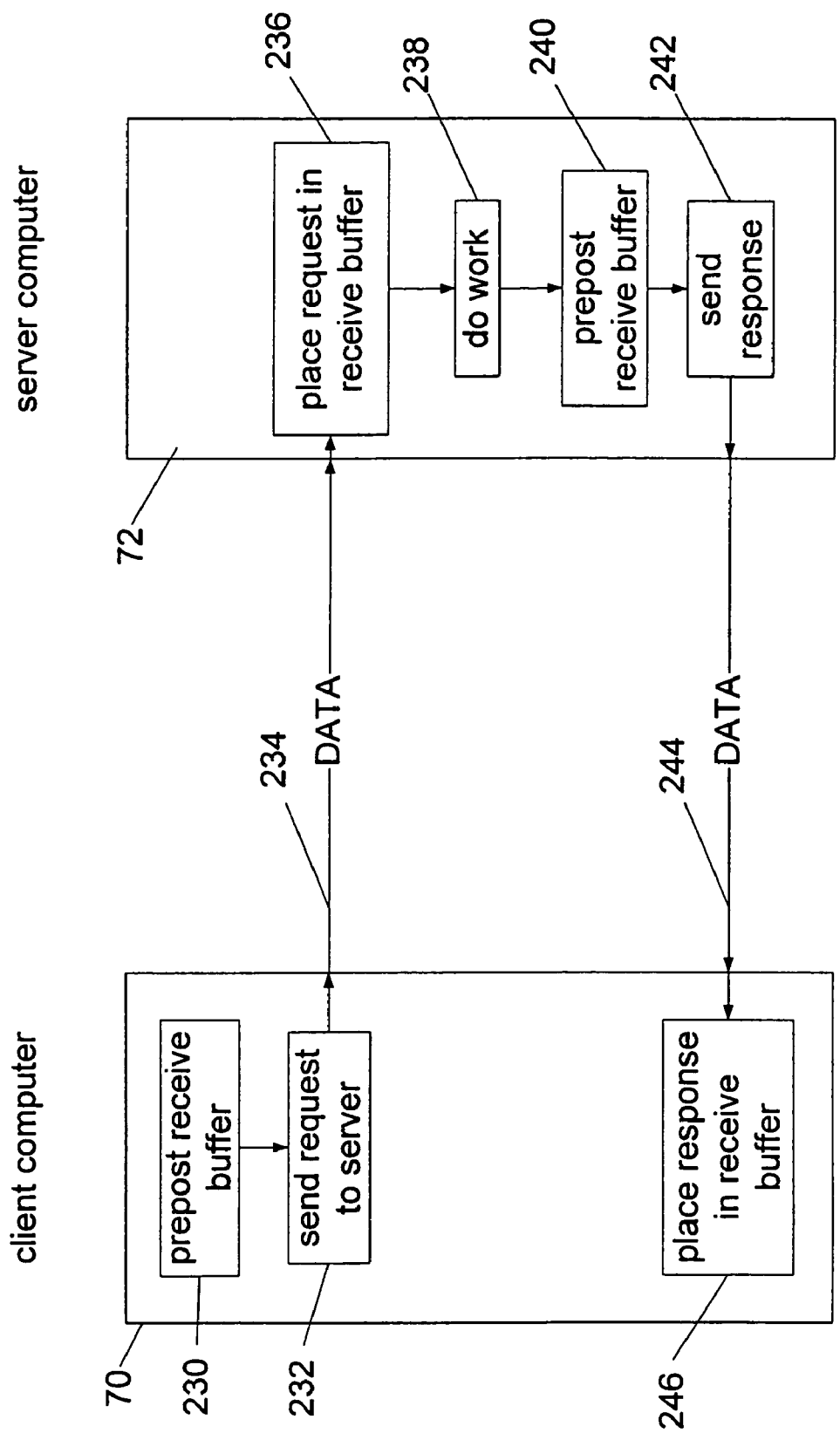
FIG. 8 is a communication flow diagram generally illustrating implicit flow control according to one aspect of the present invention.

As can be seen from FIG. 7, the known flow control protocol results in two OK TO SEND messages for each client request and server response. The flow control messages thus account for 50% of the message traffic. Furthermore, the efficiency of the system is reduced when the client and server computers wait for one another to send explicit flow control messages, not performing any useful work in the interim. The present invention contemplates removing the overhead and the inefficiency of the known system by implementing an implicit flow control at the loadable transport layers 128 and 134 and turning off the explicit flow control in the user mode stack 148 and 149. An implicit flow control relies on RPC semantics to ensure that each packet sent has a destination that is capable of receiving it. The implicit flow control of the present invention is shown in FIG. 8. As can be seen, neither of the OK TO SEND explicit flow control transmissions of FIG. 7 are present. The explicit flow control messages can be eliminated because, prior to sending any data, each computer can first pre-post a receive buffer. Therefore, the very act of sending a message is an indication to the other computer that the receive buffer is already posted and the computer is ready to receive. Thus, the other computer need not wait for an explicit flow control message; rather the receipt of any message is an implicit OK TO SEND. This implicit flow control, as will be described in more detail with reference to FIG. 8, allows for the removal of the flow control messages. Furthermore, as will be described in more detail with reference to FIG. 9, the implicit flow control of the present invention can increase the efficiency of the overall system by reducing the unproductive computer time spent waiting for explicit flow control messages to be sent.

The implicit flow control of the present invention requires the size of the pre-posted buffer to be sufficiently large so that it may accept whatever data was sent. Generally a default size can be chosen, such as the Maximum Transfer Unit (MTU) of the network. An overflow of the pre-posted buffer will result in an error and a request to resend the data, delaying processing of the data. As an alternative, a default size smaller than the MTU could be chosen, decreasing the amount of resources used, but increasing the number of overflows and resend requests, and thereby decreasing the overall speed of the system.

In an RPC context, there can exist non-RPC communication. A non-RPC communication is a communication in which at least one of the two parties has no receive operation following its send operation. In such a case, the optimized flow control may not be applicable, because the total number of messages is not an even number. One example of such a non-RPC communication is an authentication between a client and a server. Authentication can be of the form: request by client, challenge with counter-challenge by server, and response by client. This sequence of three messages can be made to maintain RPC semantics by simply adding a fourth message back to the client from the server. Alternatively, the client's first method call can be combined with the third authentication message, the response by the client, so that one message accomplishes both functions, and an even number of messages is maintained.

FIG. 8 illustrates a steady-state situation in the implicit flow control case. Initially, the server computer 72 can post a receive buffer so that it may be able to receive a message from the client computer 70. In FIG. 8, it is assumed that the receive buffer used at step 236 was posted in a prior sequence. Therefore, beginning with step 230, the client computer 70 pre-posts a receive buffer. Once the client computer 70 has posted the receive buffer, it can send its request to the server. Thus, at step 232, the client sends data 234 to the server. The server, at step 236, places the data 234 into the receive buffer that was posted during an earlier cycle, as described above. At step 238, the server computer 72 can perform the work requested by the client. At step 240, prior to sending the response to the client, the server can pre-post a receive buffer. Once the receive buffer is posted, at step 242 the server computer 72 can send to the client computer 70 data 244, which can be placed by the client in the receive buffer at step 246. The receive buffer into which the response is placed at step 246 is the receive buffer which was posted at step 230. The sending of data 234 to the server was an implicit OK TO SEND from the client to the server. Thus, at step 242, the server could send the response data 244 without waiting for an explicit OK TO SEND.

As explained above, an explicit flow control system reduces the efficiency of the overall system by requiring each computer to idle while waiting for an explicit OK TO SEND flow control message. The implicit flow control of the present invention can improve the system efficiency by reducing the amount of time each computer idles waiting for explicit flow control messages. As can be seen with reference to FIG. 8, when the server computer 72 has finished its computations at step 238, it is ready to send the response data 244 to the client computer 70. The server 72 need not wait for an explicit flow control message. Rather, it can send data 244 as soon as it has pre-posted the receive buffer 240. Thus, the amount of time between the completion of work at step 238 and the sending of the response at step 242 is minimized. The client computer 70, therefore, receives a result from the server 72 in less time than in the known explicit flow control environment.

As will be known by those skilled in the art, in addition to posting receive buffers, each computer can clear those buffers once the data stored therein is no longer needed by the computer. In such a manner the same physical memory of a computer can be reused, ensuring that communication can continue indefinitely. Furthermore, as is also known by those of skill in the art, the sending of data from one computer to another, such as the send operations in steps 232 and 242 of FIG. 8, requires that the data 234 and 244 be placed in a send buffer for transmission. Therefore, there also exist send buffers which can also be cleared, in a manner analogous to the clearing of the receive buffers.

Figure 9:
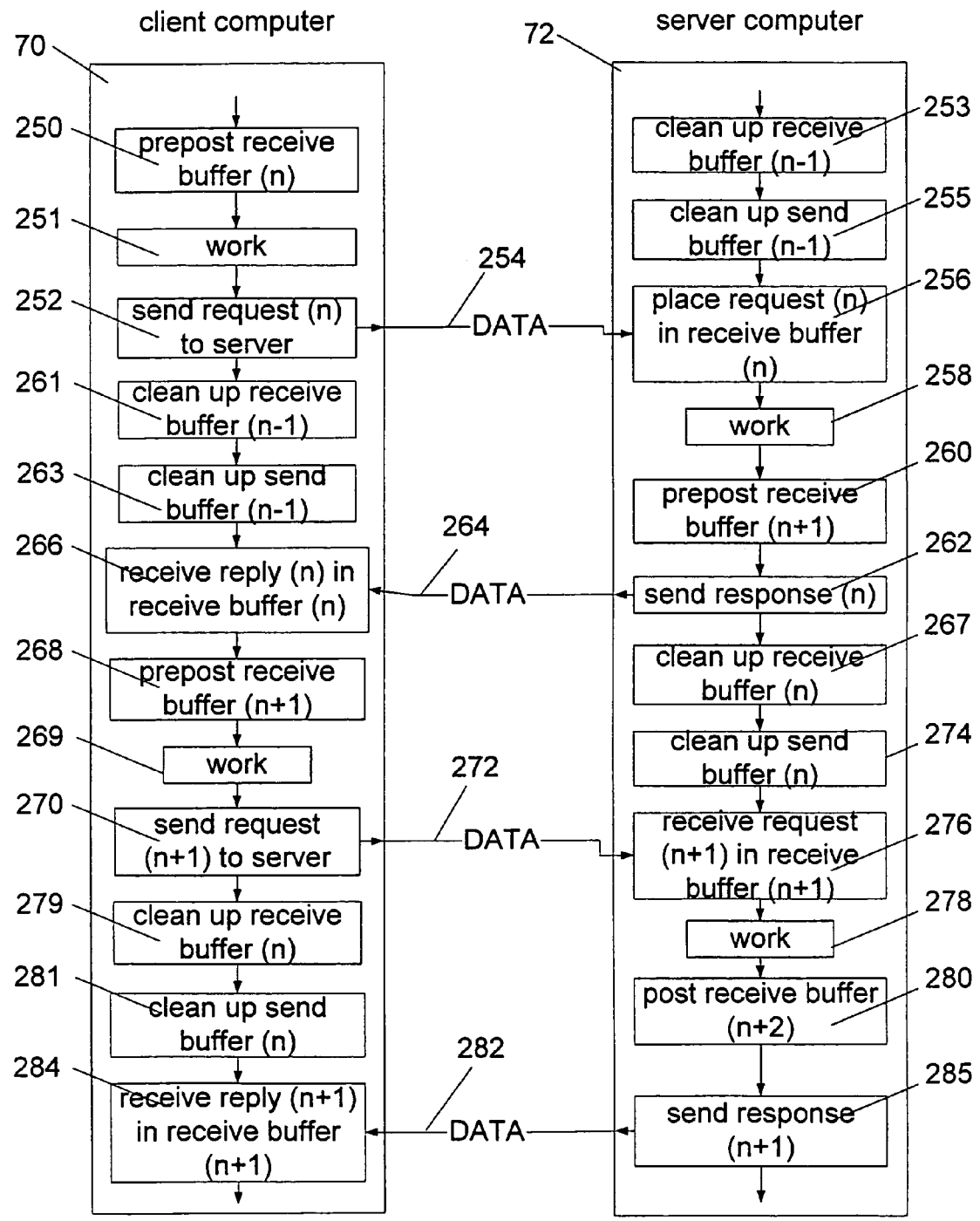
FIG. 9 is a communication flow diagram generally illustrating implicit flow control according to another aspect of the present invention.

In the known explicit flow control, the client and the server could clear the buffers while waiting for an explicit OK TO SEND message. The present invention, however, provides greater flexibility with respect to the timing of the clear send buffer and clear receive buffer operations. Those operations can be delayed so that a computer can receive a request, perform work, and return a result in the least amount of time, thereby increasing the overall efficiency of the system. FIG. 9 illustrates the sequence of the buffer clearing operations, as contemplated by the present invention. As with FIG. 8, FIG. 9 illustrates a steady-state system. The index shown in FIG. 9 indicates the round of communication between the client and server computers. Because FIG. 9 illustrates a steady-state system, which can exist at any time, the index n is used to indicate any integer. Thus, the receive buffer posted at step 250 will receive the nth response from the server computer.

As will be described later, at step 268 the client computer pre-posts a receive buffer which will receive the next response from the server, or the n+1th response.

As described in detail above, the implicit flow control of the present invention contemplates that the receive buffers can be posted prior to the sending of any data, so that the sending of the data itself is the implicit OK TO SEND message to the other computer. Thus, prior to sending the nth request at step 252, the client computer 70 pre-posts the receive buffer at step 250 to accept the response to the nth request: the nth response. At step 251 the client 70 performs the work which necessitates the request to the server 72. The client can then send the request at step 252 as data 254. At step 256, the server computer 72 receives the data 254 into a receive buffer which was posted during an earlier cycle, not shown. As can be seen from the figure, prior to the receipt of the nth request from the client at step 256, the server computer cleared, at step 253, the receive buffer from the request prior to the nth request, the n−1th request. Similarly, at step 255, the server computer 72 cleared the send buffer from the n−1th reply. Therefore, the buffers which are cleared are those from the round of communication prior to the current round.

At step 258, the server does work on the request, and at step 260, the server pre-posts the receive buffer for the coming request, the n+1th request. At step 262 the server sends the response to the request of the current round, the nth round, and that is received by the client at step 266 into the receive buffer which was posted at step 250. While the server computer 72 was performing work at step 258, the client computer 70 cleared the receive buffer from the prior round, the n−1th round in step 261 and cleared the send buffer from the prior round in step 263, as shown in FIG. 9. Similarly, after the server 72 sent the response at step 262, it cleared the receive buffer at step 267 and the send buffer at step 274. The send buffer cleared in step 274 was the buffer used to send the response in step 262.

The cycle of pre-post receive buffer, perform work, send request or reply, clean up receive, clean up send, and receive reply or request repeats itself for each request and response cycle. A second cycle is illustrated in FIG. 9, as steps 268 through 285. The second cycle reveals that the clean up operations are interleaved with the send and receive operations, and trail by one round. For example, the buffer pre-posted at step 250 by the client receives data at step 266 and is cleared at step 279. Similarly, the send buffer used by the client at step 252 is cleaned up at step 281. On the server side, the buffer into which data was received at step 256 is cleared in step 267. Also on the server, the receive buffer that was pre-posted in step 260 received data in step 276, and the send operation in step 262 was cleaned up in step 274.

Because the implicit flow control of the present invention allows the clean up operations to be flexibly timed, they can be scheduled to take place during the time in which the computer is waiting for a response. For example, when the client computer 70 sends the request at step 252, it may not be able to do substantive work until it receives a reply at step 266. Therefore, scheduling buffer clearing operations, such as those at steps 261 and 263 in the time between step 252 and 264 provides for efficiencies at the client side. At the server side, the server 72 can decrease the time the client may be waiting for a response by decreasing the time between step 256 when it receives a request, and step 262 when it sends the response. Thus, in the interim, the server 72 only performs the work requested by the client, at step 258, and preposts the receive buffer at step 260, as contemplated by the implicit flow control of the present invention. The server 72 can then clear its buffers after step 262 when the client may no longer be waiting for it to respond to the client's request. As, can be seen, by scheduling the clearing of the send and receive buffers outside of the receive operation and the responding send operation cycle, the overall efficiency of the system can be increased by decreasing the time each computer waits for the other to respond.

The present invention provides three mechanisms for enhancing the speed of DCOM over a network. At the application level, copying is reduced by using an array of pointers rather than the values themselves and taking advantage of the network interface card's ability to do scatter-gather. The duplication of effort between the RPC runtime and the DCOM runtime is eliminated by removing the dispatching of the RPC runtime layer. Finally, at the transport level, the flow control is accelerated by switching to an implicit flow control, and scheduling the clear buffers commands outside of the critical time to reduce idle. Each of the three mechanisms can be used by themselves or in any combination to achieve a speed increase over the prior art.

All of the references cited herein, including patents, patent applications, and publications, are hereby incorporated in their entireties by reference. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of communication between a first object located on a first computer and a second object located on a second computer, the first and second computers connected by a network, the method comprising:
    calling an interface of the second object by the first object on the first computer, and wherein the calling the interface of the second object by the first object comprises (a) bypassing a mechanism, the bypassed mechanism comprising adding a remote procedure call (RPC) interface identifier (IID) of the second object to the call, and (b) adding an interface pointer identifier (IPID) to the call;
    performing RPC utility functions on the call at the first computer; and
    communicating the call to the second computer, wherein the second computer:
        receives the call;
        performs RPC utility functions on the call;
        determines if the call includes the IPID;
        if the call does not include the IPID, calls an RPC dispatching function;
        if the call does include the IPID, calls an alternative dispatching function based on the IPID, bypassing the RPC dispatching function;
        invokes a stub; and
        accesses the interface of the second object identified by the IPID.

2. The method of claim 1 wherein the calling of the interface comprises:
    posting, on the first computer, a first send buffer and a first receive buffer prior to sending a first data to the second computer, wherein the first receive buffer will receive a second data from the second computer, and wherein the first receive buffer is posted to be of sufficient size to accept the second data; and
    sending the first data to the second computer via the first send buffer.

3. The method of claim 2 wherein the calling further comprises: cleaning up, on the first computer, a second receive buffer after sending the first data to the second computer and prior to receiving the second data from the second computer.

4. The method of claim 2 wherein the calling further comprises: cleaning up, on the first computer, a second send buffer after sending the first data to the second computer and prior to receiving the second data from the second computer.

5. The method of claim 1 wherein the first computer has a first memory location and a buffer, and access to the network through an interface card on the first computer, the method further comprising:
    placing in the buffer a copy of a first pointer to a first parameter, wherein the first parameter is used in the calling of the interface of the second object and wherein the first pointer points to the first parameter in the first memory location; and
    transmitting, by the network interface card, the first parameter pointed to by the first pointer by reading the first parameter out of the first memory location.

6. The method of claim 5 further comprising issuing a notification on the first computer after the network interface card has finished reading the first parameter out of the first memory location.

7. The method of claim 5 further comprising:
    placing in the buffer a copy of the first pointer to the first parameter and a copy of a second pointer to a second parameter, wherein the second parameter is used in the calling of the interface of the second object and wherein the second pointer points to the second parameter in a second memory location on the first computer; and
    transmitting, by the network interface card, the first parameter pointed to by the first pointer by reading the parameter out of the first memory location and the second parameter pointed to by the second pointer by reading the second parameter out of the second memory location.

8. The method of claim 7 further comprising:
    issuing a first notification on the first computer after the network interface card has finished reading the first parameter out of the first memory location; and
    issuing a second notification on the first computer after the network interface card has finished reading the second parameter out of the second memory location.

9. The method of claim 8 further comprising:
    reclaiming the first memory location after receiving the first notification; and
    reclaiming the second memory location after receiving the second notification.

10. The method of claim 5 wherein the transmitting comprises:
    posting, on the first computer, a first send buffer and a first receive buffer prior to sending a first data to the second computer, wherein the first receive buffer will receive a second data from the second computer, and wherein the first receive buffer is posted to be of sufficient size to accept the second data; and
    sending the first data to the second computer via the first send buffer.

11. The method of claim 10 wherein the transmitting further comprises:
    cleaning up, on the first computer, a second receive buffer after sending the first data to the second computer and prior to receiving the second data from the second computer.

12. The method of claim 10 wherein the transmitting further comprises:
cleaning up, on the first computer, a second send buffer after sending the first data to the second computer and prior to receiving the second data from the second computer.

13. The method of claim 1, wherein the IPID is according to the DCOM object model.

14. One or more computer-readable medium having computer-executable instructions to enable communications between a first object located on a first computer and a second object located on a second computer, the first and second computers connected by a network, the computer-executable instructions performing steps comprising:
calling an interface of the second object by the first object on the first computer, wherein the computer-executable instructions for calling the interface of the second object by the first object comprise (a) computer-executable instructions for bypassing computer executable instructions, the bypassed computer-executable instructions comprising adding a remote procedure call (RPC) interface identifier (IID) of the second object to the call, and (b) adding an interface pointer identifier (IPID) to the call;
performing RPC utility functions on the call at the first computer; and
communicating the call to the second computer, wherein the second computer:
receives the call;
performs RPC utility functions on the call;
determines if the call includes the IPID;
if the call does not include the IPID, calls an RPC dispatching function;
if the call does include the IPID, calls an alternative dispatching function based on the IPID, bypassing the RPC dispatching function;
invokes a stub; and
accesses the interface of the second object identified by the IPID.

15. The one or more computer-readable medium of claim 14 wherein the calling of the interface comprises:
posting, on the first computer, a first send buffer and a first receive buffer prior to sending a first data to the second computer, wherein the first receive buffer will receive a second data from the second computer, and wherein the first receive buffer is posted to be of sufficient size to accept the second data; and sending the first data to the second computer via the first send buffer.

16. The one or more computer-readable medium of claim 15 wherein the calling further comprises:
cleaning up, on the first computer, a second receive buffer after sending the first data to the second computer and prior to receiving the second data from the second computer.

17. The one or more computer-readable medium of claim 15 wherein the calling further comprises:
cleaning up, on the first computer, a second send buffer after sending the first data to the second computer and prior to receiving the second data from the second computer.

18. The one or more computer-readable medium of claim 14, wherein the first computer has a first memory location and a buffer, and access to the network through an interface card on the first computer, having further computer-executable instructions for performing steps comprising:
placing in the buffer a copy of a first pointer to a first parameter, wherein the first parameter is used in the calling of the interface of the second object and wherein the first pointer points to the first parameter in the first memory location; and transmitting, by the network interface card, the first parameter pointed to by the first pointer by reading the first parameter out of the first memory location.

19. The one or more computer-readable medium of claim 18 having further computer-executable instructions for performing steps comprising:
issuing a notification on the first computer after the network interface card has finished reading the first parameter out of the first memory location.

20. The one or more computer-readable medium of claim 19 having further computer-executable instructions for performing steps comprising:
reclaiming the first memory location after receiving the notification.

21. The one or more computer-readable medium of claim 18 having further computer-executable instructions for performing steps comprising:
placing in the buffer a copy of the first pointer to the first parameter and a copy of a second pointer to a second parameter, wherein the second parameter is used in the calling of the interface of the second object and wherein the second pointer points to the second parameter in a second memory location on the first computer; and
transmitting, by the network interface card, the first parameter pointed to by the first pointer by reading the parameter out of the first memory location and the second parameter pointed to by the second pointer by reading the second parameter out of the second memory location.

22. The one or more computer-readable medium of claim 21 having further computer-executable instructions for performing steps comprising:
issuing a first notification on the first computer after the network interface has finished reading the first parameter out of the first memory location; and
issuing a second notification on the first computer after the network interface card has finished reading the second parameter out of the second memory location.

23. The one or more computer-readable medium of claim 22 having further computer-executable instructions for performing steps comprising:
reclaiming the first memory location after receiving a notification and reclaiming the second memory location after receiving the second notification.

24. The one or more computer-readable medium of claim 18 wherein the transmitting comprises:
posting, on the first computer, a first send buffer and a first receive buffer prior to sending a first data to the second computer, wherein the first receive buffer will receive a second data from the second computer, and wherein the first receive buffer is posted to be of sufficient size to accept the second data; and
sending the first data to the second computer via the first send buffer.

25. The one or more computer-readable medium of claim 24 wherein the transmitting further comprises:
cleaning up, on the first computer, a second receive buffer after sending the first data to the second computer and prior to receiving the second data from the second computer.

26. The one or more computer-readable medium of claim 24 wherein the transmitting further comprises:
   cleaning up, on the first computer, a second send buffer after sending the first data to the second computer and prior to receiving the second data from the second computer.

27. The one or more computer readable medium of claim 14, wherein the IPID is according to the DCOM object model.

28. A method of communication between a first object located on a first computer and a second object located on a second computer, the first and second computers connected by a network, the method comprising:
   receiving, at the second computer, a call to an interface of the second object from the first object on the first computer;
   performing remote procedure call (RPC) utility functions on the received call, wherein the RPC utility functions are performed on the received call by a RPC utility layer, the RPC utility layer comprising a pointer to an alternative dispatching function, wherein the pointer allows the call to be passed directly to the dispatching layer;
   determining the call does not contain an RPC interface identifier (IID) but does contain an interface pointer identifier (IPID);
   passing the received call to the alternative dispatching function so as to bypass a RPC dispatching function, wherein the bypassed RPC dispatching function would have otherwise been called if the IPID was not contained in the call;
   invoking a stub; and
   accessing the interface of the second object.

29. The method of claim 28 wherein the receiving comprises:
   storing, on the second computer, a second data into a first receive buffer, wherein the first receive buffer was posted prior to sending a first data to the first computer.

30. The method of claim 29 wherein the receiving further comprises:
   cleaning up, on the second computer, a send buffer after sending the first data to the first computer and prior to receiving the second data from the first computer.

31. The method of claim 29 wherein the receiving further comprises: cleaning up, on the second computer, a second receive buffer after sending the first data to the first computer and prior to receiving the second data from the first computer.

32. The method of claim 28 wherein the second computer has a memory storage location and a buffer, and access to the network through a network interface card on the second computer, the method further comprising: receiving a call from the first object on the interface of the second object;
   receiving, by the network interface card, a parameter of the call from the first object;
   storing the parameter in a memory location; and
   accessing, by the second object, the parameter.

33. The method of claim 32 wherein the memory location is the buffer, and wherein the accessing the parameter is performed in the buffer.

34. The method of claim 33 further comprising copying the parameter from the buffer into the memory storage location, wherein the accessing the parameter is performed in the memory storage location.

35. The method of claim 32 wherein the memory location is the memory storage location, and wherein the accessing the parameter is performed in the memory storage location.

36. The method of claim 32 wherein the receiving comprises:
   storing, on the second computer, a second data into a first receive buffer, wherein the first receive buffer was posted prior to sending a first data to the first computer, and wherein the first receive buffer was posted to be of sufficient size to accept the second data.

37. The method of claim 36 wherein the receiving further comprises:
   cleaning up, on the second computer, a send buffer after sending the first data to the first computer and prior to receiving the second data from the first computer.

38. The method of claim 36 wherein the receiving further comprises:
   cleaning up, on the second computer, a second receive buffer after sending the first data to the first computer and prior to receiving the second data from the first computer.

39. The method of claim 28, wherein the IPID is according to the DCOM object model.

40. One or more computer-readable medium having computer-executable instructions to enable communications between a first object located on a first computer and a second object located on a second computer, the first and second computers connected by a network, the computer-executable instructions performing steps comprising:
   receiving, at the second computer, a call to an interface of the second object from the first object on the first computer;
   performing remote procedure call (RPC) utility functions on the received call, wherein the computer-executable instructions for performing RPC utility functions on the received call comprise a pointer to the dispatching function, wherein the pointer allows the call to be passed directly to the dispatching layer;
   determining the call does not contain an RPC interface identifier (IID) but does contain an interface pointer identifier (IPID);
   passing the received call to a dispatching function so as to bypass a RPC dispatching function, wherein the bypassed RPC dispatching function would have otherwise been called if the IPID was not contained in the call;
   invoking a stub; and
   accessing the interface of the second object.

41. The one or more computer-readable medium of claim 40 wherein the receiving comprises: storing, on the second computer, a second data into a first receive buffer, wherein the first receive buffer was posted prior to sending a first data to the first computer.

42. The one or more computer-readable medium of claim 41 wherein the first data to the first computer was sent prior to receiving the second data from the first computer.

43. The one or more computer-readable medium of claim 41 wherein the receiving further comprises:
   cleaning up, on the second computer, a send buffer after sending the first data to the first computer and prior to receiving the second data from the first computer.

44. The one or more computer-readable medium of claim 41 wherein the receiving further comprises:
   cleaning up, on the second computer, a second receive buffer after sending the first data to the first computer and prior to receiving the second data from the first computer.

45. The one or more computer-readable medium of claim 40 wherein the second computer has a memory storage location and a buffer, and access to the network through a network interface card on the second computer, having further computer-executable instructions for performing steps comprising:

receiving a call from the first object on the interface of the second object;

receiving, by the network interface card, a parameter of the call from the first object;

storing the parameter in a memory location; and accessing, by the second object, the parameter.

46. The one or more computer-readable medium of claim 45 wherein the memory location is the buffer, and wherein the accessing the parameter is performed in the buffer.

47. The one or more computer-readable medium of claim 46 having further computer-executable instructions for performing steps comprising:

copying the parameter from the buffer into the memory storage location, wherein the accessing the parameter is performed in the memory storage location.

48. The one or more computer-readable medium of claim 45 wherein the memory location is the memory storage location, and wherein the accessing the parameter is performed in the memory storage location.

49. The one or more computer-readable medium of claim 45 wherein the receiving comprises:

storing, on the second computer, a second data into a first receive buffer, wherein the first receive buffer was posted prior to sending a first data to the first computer, and wherein the first receive buffer was posted to be of sufficient size to accept the second data.

50. The one or more computer-readable medium of claim 49 wherein the first data to the first computer was sent prior to receiving the second data from the first computer.

51. The one or more computer-readable medium of claim 49 wherein the receiving further comprises:

cleaning up, on the second computer, a send buffer after sending the first data to the first computer and prior to receiving the second data from the first computer.

52. The one or more computer-readable medium of claim 49 wherein the receiving further comprises:

cleaning up, on the second computer, a second receive buffer after sending the first data to the first computer and prior to receiving the second data from the first computer.

53. The one or more computer readable medium of claim 40, wherein the IPID is according to the DCOM object model.

54. A computing device comprising:

a processor;

an object, the object comprising an interface that is called by a second object on a second computing device;

a network connection, wherein the network connection communicationally connects the computing device to the second computing device;

a remote procedure call (RPC) utility layer, wherein the RPC utility layer (a) determines whether the call contains an RPC interface identifier (IID), (b) performs RPC utility functions on the interface call by the second object, and (c) passes the interface call to a dispatching function, the dispatching function being a RPC dispatching function when the call contains an RPC IID, and an alternative dispatching function when the call does not contain an RPC IID but does contain an interface pointer identifier (IPID), and wherein the RPC utility layer comprises a pointer to the alternative dispatching function, wherein the pointer allows the call to be passed directly to the alternative dispatching function; and a dispatching layer comprising the alternative dispatching function, wherein the dispatching layer invokes a stub and accesses the interface.

55. The computing device of claim 54, wherein the IPID is according to the DCOM object model.

56. A computing device comprising:

a processor;

an object, the object calling an interface of a second object on a second computing device;

a remote procedure call utility layer, wherein the remote procedure call utility layer performs remote procedure call utility functions on the call;

a bypass of a mechanism, the mechanism comprising adding a remote procedure call (RPC) interface identifier (IID) to the call; and a network connection, wherein the network connection communicates the call to the second computing device, and wherein further the second computing device receives the call, performs RPC utility functions on the call, determines whether the call contains the RPC IID, when the call contains the RPC IID, passes the call to a RPC dispatching function, when the call does not contain the RPC IID but does contain an interface pointer identifier (IPID), passes the call to an alternative dispatching function so as to bypass the RPC dispatching function, invokes a stub, and accesses the interface of the second object.

57. The computing device of claim 56, wherein the IPID is according to the DCOM object model.

* * * * *